(12) United States Patent
Shao et al.

(10) Patent No.: US 11,671,019 B2
(45) Date of Patent: Jun. 6, 2023

(54) BRIDGE CIRCUIT WITH SERIES-CONNECTED SWITCHES AND CONTROL METHOD THEREOF

(71) Applicant: Zhejiang University, Hangzhou (CN)

(72) Inventors: Shuai Shao, Hangzhou (CN); Jianjia Zhang, Hangzhou (CN); Zhi Gao, Hangzhou (CN); Yucen Li, Hangzhou (CN); Junming Zhang, Hangzhou (CN); Kuang Sheng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 12 days.

(21) Appl. No.: 17/375,514

(22) Filed: Jul. 14, 2021

(65) Prior Publication Data
US 2022/0038010 A1 Feb. 3, 2022

(30) Foreign Application Priority Data
Jul. 29, 2020 (CN) .......................... 202010741287.9

(51) Int. Cl.
*H02M 3/335* (2006.01)
*H02M 7/483* (2007.01)
*H02M 3/00* (2006.01)

(52) U.S. Cl.
CPC ............. *H02M 3/335* (2013.01); *H02M 3/01* (2021.05); *H02M 7/4833* (2021.05); *H02M 7/4835* (2021.05)

(58) Field of Classification Search
CPC ....... H02M 3/335; H02M 3/01; H02M 7/5387; H02M 7/4833; H02M 7/4835
See application file for complete search history.

(56) References Cited

U.S. PATENT DOCUMENTS

| 2010/0020577 A1* | 1/2010 | Dommaschk ....... H02M 7/4835 363/63 |
| 2017/0257022 A1* | 9/2017 | Bryant .................. H02M 1/088 |

* cited by examiner

*Primary Examiner* — Peter M Novak
(74) *Attorney, Agent, or Firm* — Muncy, Geissler, Olds & Lowe, P.C.

(57) ABSTRACT

A bridge circuit with series-connected switches and associated control method. The bridge circuit has a first bridge arm and a second bridge arm coupled to a common node, the first bridge arm has a plurality of series-connected first main switches, each first main switch is coupled in parallel with an auxiliary module, each first auxiliary module has a clamping capacitor and an auxiliary switch, the first bridge arm receives a first main switch signal to control the plurality of series-connected first main switches, the second bridge arm receives a second main switch signal, the control method is sensing voltages of the clamping capacitors in the first bridge arm, correspondingly generating voltage sensing signals, and turning on at least one auxiliary switch for a predetermined time during a dead time according to a sorting result of the voltage sensing signals.

18 Claims, 10 Drawing Sheets

(a)  (b)

BRIDGE CIRCUIT WITH SERIES-CONNECTED SWITCHES AND CONTROL METHOD THEREOF

CROSS-REFERENCE TO RELATED APPLICATIONS

This application claims the benefit of CN application 202010741287.9, filed on Jul. 29, 2020, and incorporated herein by reference.

TECHNICAL FIELD

The present invention generally relates to electronic circuits, and more particularly but not exclusively, to a bridge circuit with series-connected switches and control method thereof.

BACKGROUND

In high-power and high-voltage applications, using series-connected power devices is a good choice. However, a main concern of the series-connected power devices is the unbalanced static and dynamic voltage sharing mainly caused by parameter difference of each series-connected power device (e.g. gate threshold voltage and junction capacitance) and gate signal delays. To solve this problem, traditional methods can be classified into three main types: passive snubber circuits, gate control circuits and voltage clamping circuits.

A passive snubber circuit can balance the voltage of the series-connected power devices by connecting a circuit composed of capacitors, resistors, semiconductor diodes or their combinations in parallel with each series-connected power device. However, a large snubber capacitor of the passive snubber circuit causes obvious snubber loss, increases the volume and reduces the switching speed of the series-connected power devices, which is not available in high frequency applications. A gate drive control circuit can balance the voltage of the series-connected power devices by sampling voltages of the series-connected power devices and adjusting the delay or voltage amplitude of the gate drive signals. However, it is necessary to introduce additional voltage sensing circuits and gate signal drive delay or voltage amplitude compensation circuits, which increases the cost and the complexity. A voltage clamping circuit can balance the voltage of the series-connected power devices by connecting a circuit comprising clamping capacitors, resistors, semiconductor diodes or their combinations coupled in parallel with each series-connected power device. The circuit absorbs the voltage spike when the series-connected power devices are asynchronous and clamps the voltage of the series-connected power devices to the capacitor voltage. Thus, to balance the voltages of the series-connected power devices is to balance the capacitor voltages. A resistor is usually connected in parallel with each series-connected power device to achieve the static voltage sharing, and the excess energy absorbed by the clamping capacitor is generally consumed on the resistor, which increases the power loss.

SUMMARY

To overcome the shortcomings of the existing technology, the present invention provides a bridge circuit with series-connected switches and control method thereof.

Embodiments of the present invention are directed to a bridge circuit with series-connected switches, comprising: a first bridge arm, a second bridge arm, a voltage sensing circuit and a control circuit. The first bridge arm comprises a first terminal, a second terminal and a control terminal. A plurality of series-connected first main switches are coupled between the first terminal and the second terminal. Each of the plurality of series-connected first main switches is coupled in parallel with a first auxiliary module, each first auxiliary module comprises a first clamping capacitor and a first auxiliary switch, and the control terminal is configured to receive a first main switch signal to control the plurality of series-connected first main switches. The second bridge arm comprises a first terminal, a second terminal, a control terminal and at least a second main switch. The first terminal of the second bridge arm is coupled with the second terminal of the first bridge arm at a common node, and the control terminal of the second bridge arm is configured to receive a second main switch signal to control the at least a second main switch. The voltage sensing circuit is configured to sample voltages of the first clamping capacitors in the first bridge arm, and is configured to correspondingly generate first voltage sensing signals according to the voltages of the first clamping capacitors. The control circuit, configured to receive the first voltage sensing signals and correspondingly generate first auxiliary switch signals according to the first voltage sensing signals and a first dead time to respectively control the first auxiliary switches.

Embodiments of the present invention are directed to a control method for a bridge circuit with series-connected switches, wherein the bridge circuit comprises a first bridge arm and a second bridge arm. The first bridge arm comprises a plurality of series-connected first main switches. Each of the plurality of series-connected first main switch is coupled in parallel with a first auxiliary module. Each first auxiliary module comprises a first clamping capacitor and a first auxiliary switch. The second bridge arm comprises at least a second main switch. The first bridge arm is configured to receive a first main switch signal to control the plurality of series-connected first main switches. The second bridge arm is configured to receive a second main switch signal to control the at least a second main switch. The control method comprises sensing voltages of the first clamping capacitors in the first bridge arm and correspondingly generating first voltage sensing signals; and turning on at least one first auxiliary switch for a predetermined time during a first dead time according to a sorting result of the first voltage sensing signals, wherein the predetermined time is equal to or less than the first dead time.

Embodiments of the present invention are directed to a control method for a bridge circuit with series-connected switches, wherein the bridge circuit comprises a first bridge arm and a second bridge arm coupled at a common node. The first bridge arm comprises a plurality of series-connected first main switches. Each of the plurality of series-connected first main switch is coupled in parallel with an auxiliary module. Each auxiliary module comprises a clamping capacitor and an auxiliary switch. The second bridge arm comprises at least a second main switch. The first bridge arm is configured to receive a first main switch signal to control the plurality of series-connected first main switches. The second bridge arm is configured to receive a second main switch signal to control the at least a second main switch. The control method comprises sensing voltages of the clamping capacitors in the first bridge arm and correspondingly generating voltage sensing signals; and turning on at least one auxiliary switch for a predetermined time during a first dead time according to a sorting result of the voltage sensing signals, wherein the predetermined time is equal to or less than the first dead time; wherein the first dead time is configured to be a time from a falling edge of the second main switch signal to a rising edge of the first main switch signal.

Compared with the prior art solution, the advantages of the present invention are: the control method of the present invention uses the freewheeling current during the dead time to discharge the clamping capacitor without the static resistance, and therefore the power loss induced by voltage balance is extremely low; in the control method of the present invention, the clamping capacitor is only inserted into the circuit during the dead time, which does not affect the switching speed and the normal operation of the main switch; in the inverter circuit and its control method of the present invention, the clamping capacitor is only inserted during the dead time for voltage balance, rather than an energy storage unit, which greatly reduces the capacitance and volume of the capacitor required in the bridge circuit compared with the modular multilevel converter (MMC) and improves the power density; the bridge circuit of the present invention is beneficial to modularization, fault protection and redundancy.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
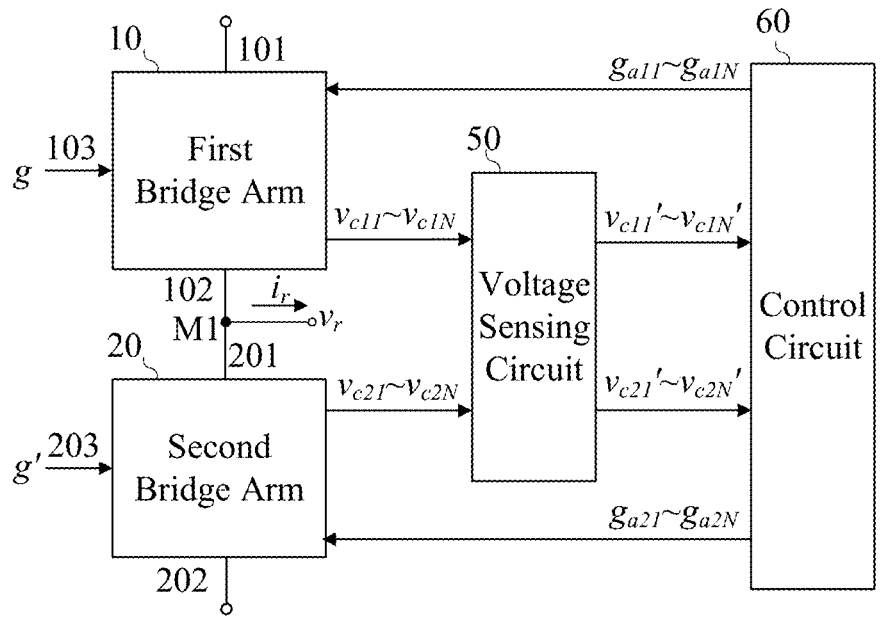
FIG. 1 is a block diagram of a half bridge circuit with series-connected switches 1000 in accordance with an embodiment of the present invention.

FIG. 1 is a block diagram of a half bridge circuit 1000 with series-connected switches in accordance with an embodiment of the present invention. The half bridge circuit 1000 comprises a first bridge arm 10, a second bridge arm 20, a voltage sensing circuit 50, and a control circuit 60. The first bridge arm 10 comprises a first terminal 101, a second terminal 102, and a control terminal 103, wherein the control terminal 103 is configured to receive a first main switch signal g. The second bridge arm 20 comprises a first terminal 201, a second terminal 202, and a control terminal 203, wherein the first terminal 201 of the second bridge arm 20 is coupled with the second terminal 102 of the first bridge arm 10 at a common node M1, and the control terminal 203 is configured to receive a second main switch signal g'. The half bridge circuit 1000 is configured to output an output current it and an output voltage vr at the common node M1.

In an embodiment of the present invention, ad time are included between the first main switching signal g and the second main switching signal g', during the first dead time, the plurality of series-connected first main switches and the at least a second main switch are off. Wherein when the output current ir is configured to lag behind the output voltage vr (e.g. the circuit coupled to the half bridge circuit 1000 is inductive), the first dead time is the dead time before the rising edge of the first main switch signal g, and the second dead time is the dead time before the rising edge of the second main switch signal g'; and when the output current ir is configured to lead the output voltage vr (e.g. the circuit coupled to the half bridge circuit 1000 is capacitive), the first dead time is the dead time before the rising edge of the second main switch signal g', and the second dead time is the dead time before the rising edge of the first main switch signal g. In an embodiment of the present invention, the first main switch signal g is complementary to the second main switch signal g'. In an embodiment of the present invention, the first dead time or the second dead time is not limited to the duration of the dead time, but also includes the moment of the dead time (e.g. the start moment, the end moment, or even the moment a little before the start moment), etc. The first dead time or the second dead time can also represent the freewheeling time in the bridge circuit.

Figure 2:
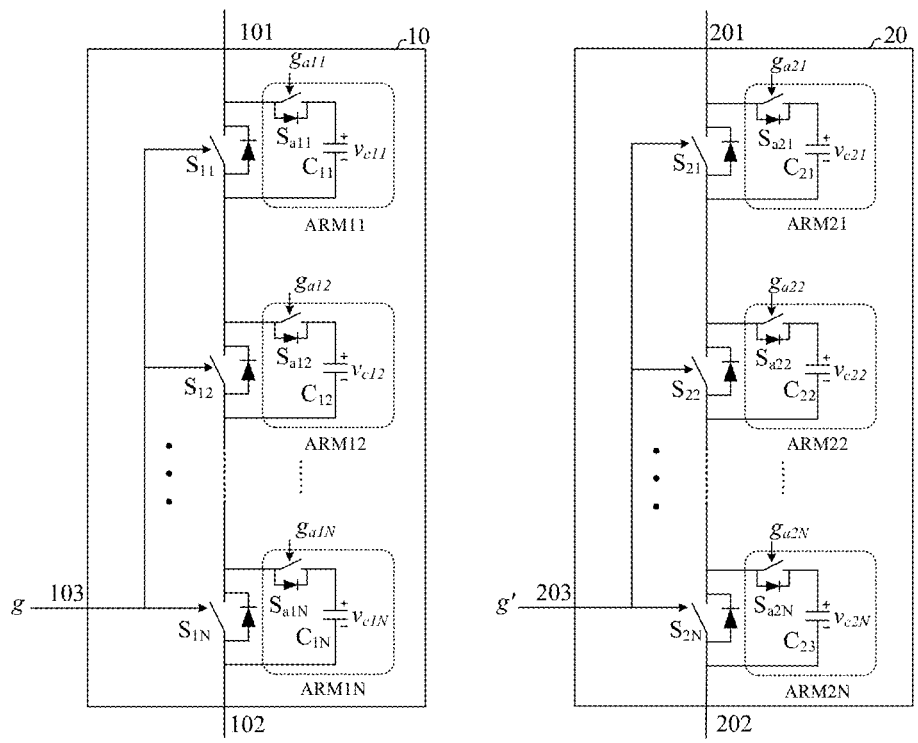
FIG. 2 schematically illustrates a circuit diagram of a first bridge arm 10 and a second bridge arm 20 in the half bridge circuit with series-connected switches 1000 in accordance with an embodiment of the present invention.

FIG. 2(*a*) schematically illustrates a circuit diagram of the first bridge arm 10 in the half bridge circuit 1000 with series-connected switches. The first bridge arm 10 comprises N series-connected main switches S11~S1N, where N is a natural number greater than or equal to 2. The first main switch signal g is configured to control the N main switches S11~S1N. An auxiliary module ARM1N is connected in parallel with each main switch S1N (e.g. the auxiliary module ARM11 is connected in parallel with the main switch S11, and the auxiliary module ARM12 is connected in parallel with the main switch S12). Each auxiliary module ARM1N comprises a clamping capacitor C1N and an auxiliary switch Sa1N (e.g. the auxiliary module ARM11 comprises the clamping capacitor C11 and the auxiliary switch Sa11). In one embodiment, each auxiliary switch Sa1N comprises an anti-parallel diode and the voltage of each clamping capacitor C1N is vc1N (e.g. the voltage of the clamping capacitor C11 is vc11), wherein each auxiliary switch Sa1N receives an auxiliary switching signal ga1N (e.g. the auxiliary switch signal ga11 is configured to control the auxiliary switch Sa11). Combining the embodiments shown in FIG. 1 and FIG. 2(*a*), the voltage sensing circuit 50 is configured to sample the voltages vc11~vc1N of the clamping capacitors C11~C1N and correspondingly generate voltage sensing signals vc11'~vc1N'. The control circuit 60 is configured to receive the voltage sensing signals vc11'~vc1N' and correspondingly generate the auxiliary switch signals ga11~ga1N according to the voltage sensing signals vc11'~vc1N' and a first dead time to respectively control the auxiliary switches Sa11~Sa1N. In one embodiment of the present invention, when a certain voltage sensing signal vc1$i$' (i ranges from 1 to N) ranks at top M among the voltage sensing signals vc11'~vc1N', the control circuit 60 is configured to control the auxiliary switch Sa1$i$ corresponding to the certain voltage sensing signal vc1$i$' keeping on for at least a first predetermined time during the first dead time, wherein the first predetermined time is less than or equal to the first dead time and not limited to the first dead time, and M is a natural number greater than or equal to one, wherein the control circuit 60 can turn on the auxiliary switch Sa1$i$ corresponding to the certain voltage sensing signal vc1$i$ at a moment before the falling edge of the first main switch signal if the first dead time is after the falling edge of the first main switch signal or at a moment before the falling edge of the second main switch signal if the first dead time is after the falling edge of the second main switch signal. In one embodiment of the present invention, the auxiliary switch Sa1$i$ can utilize the freewheeling current during the second dead time to discharge the corresponding clamping capacitor C1$i$. In one embodiment of the present invention, the first predetermined time can be set to a fixed value in advance. In other embodiments of the present invention, the first predetermined time can also be adjusted instantaneously or periodically based on needs, e.g. it can be calculated instantaneously by a digital controller or adjusted according to a feedback signal.

FIG. 2(*b*) schematically illustrates a circuit diagram of the second bridge arm 20 in the half bridge circuit 1000 with series-connected switches. The second bridge arm 20 comprises N series-connected main switches S21~S2N. The second main switch signal g' is configured to control the N main switches S21~S2N. An auxiliary module ARM2N is connected in parallel with each main switch S2N (e.g. the auxiliary module ARM21 is connected in parallel with the main switch S21, and the auxiliary module ARM22 is connected in parallel with the main switch S22). Each auxiliary module ARM2N comprises a clamping capacitor C2N and an auxiliary switch Sa2N (e.g. the auxiliary module ARM21 comprises the clamping capacitor C21 and the auxiliary switch Sa21). In one embodiment of the present invention, each auxiliary switch Sa1N comprises an anti-parallel diode and the voltage of each clamping capacitor C2N is vc2N (e.g. the voltage of the clamping capacitor C21 is vc21), wherein each auxiliary switch Sa2N receives an auxiliary switching signal ga2N (e.g. the auxiliary switch signal ga21 is configured to control the auxiliary switch Sa21). The voltage sensing circuit 50 is configured to sample the voltages vc21~vc2N of the clamping capacitors C2N~C2N and correspondingly generate voltage sensing signals vc11'~vc1N'. The control circuit 60 is configured to receive the voltage sensing signals vc21'~vc2N', and correspondingly generate the auxiliary switch signals ga21~ga2N according to the voltage sensing signals vc21'~vc2N' and a second dead time to respectively control the auxiliary switches Sa21~Sa2N. In one embodiment of the present invention, when a certain voltage sensing signal vc2$i$' ranks at top K among the voltage sensing signals vc21'~vc2N', the control circuit 60 is configured to control the auxiliary switch Sa2$i$ corresponding to the certain voltage sensing signal vc2$i$' keeping on for at least a second predetermined time during the second dead time, wherein the second predetermined time is less than or equal to the second dead time and not limited to the second dead time, and K is a natural number greater than or equal to one. The first predetermined time can be equal to the second predetermined time and the natural number N can be equal to the natural number K. In one embodiment of the present invention, the auxiliary switch Sa2$i$ can utilize the freewheeling current during the second dead time to discharge the corresponding clamping capacitor C2$i$.

Figure 3:
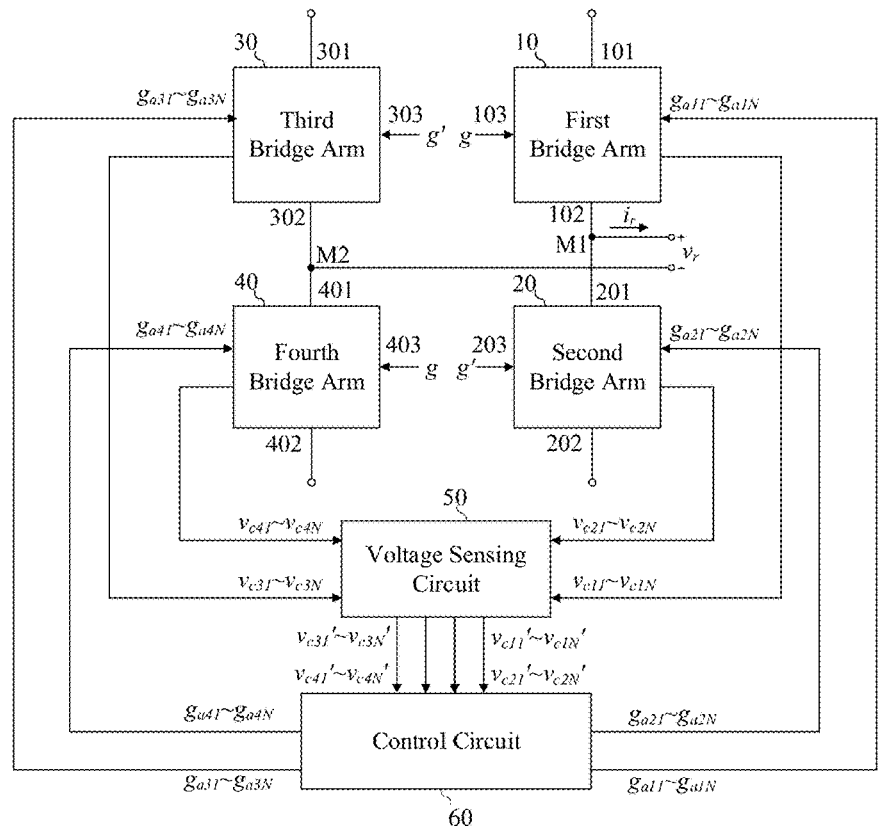
FIG. 3 is a block diagram of a full bridge circuit with series-connected switches 2000 in accordance with an embodiment of the present invention.

FIG. 3 is a block diagram of a full bridge circuit 2000 with series-connected switches in accordance with an embodiment of the present invention. The difference from the half bridge circuit 1000 with series-connected switches shown in FIG. 1 is that, the full bridge circuit 2000 further comprises a third bridge arm 30 and a fourth bridge arm 40. The third bridge arm 30 comprises a first terminal 301, a second terminal 302, and a control terminal 303, wherein the control terminal 303 is configured to receive a second main switch signal g'. The fourth bridge arm 40 comprises a first terminal 401, a second terminal 402 and a control terminal 403, wherein the second terminal 302 of the third bridge arm 30 is coupled with the first terminal 401 of the fourth bridge arm 40 at a common node M2, and the control terminal 403 is configured to receive a first main switch signal g. The full bridge circuit 2000 outputs an output current it and an output voltage vr between the common node M1 and the common node M2.

Figure 4:
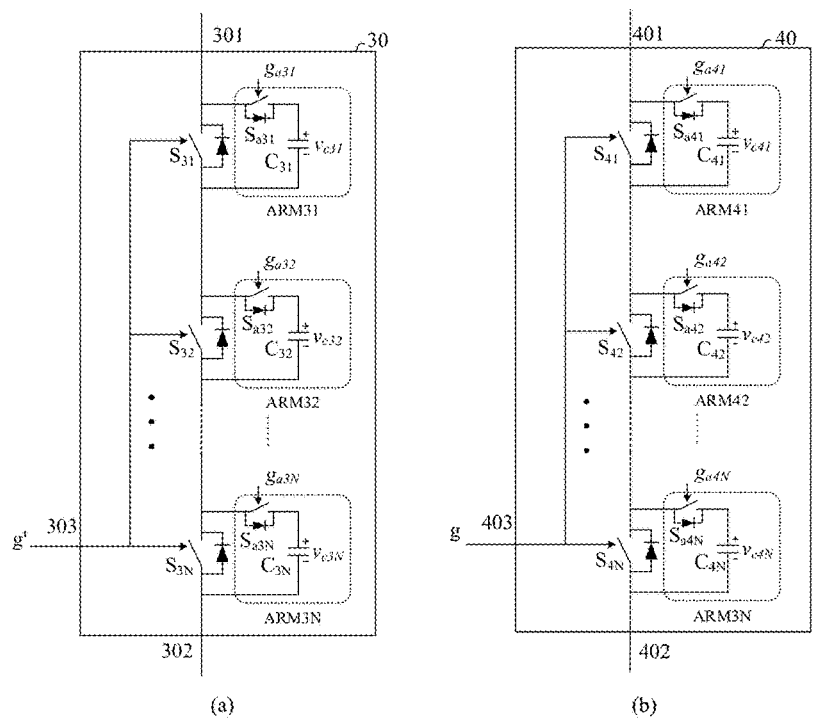
FIG. 4 schematically illustrates a circuit diagram of a third bridge arm 30 and a fourth bridge arm 40 in the full bridge circuit with series-connected switches 2000 in accordance with an embodiment of the present invention.

FIG. 4(a) schematically illustrates a circuit diagram of the third bridge arm 30 in the full bridge circuit 2000 with series-connected switches. The third bridge arm 30 comprises N series-connected main switches S31~S3N. The second main switch signal g' is configured to control the N main switches S31~S3N. An auxiliary module ARM3N is connected in parallel with each main switch S3N (e.g. the auxiliary module ARM31 is connected in parallel with the main switch S31, and the auxiliary module ARM32 is connected in parallel with the main switch S32). Each auxiliary module ARM3N comprises a clamping capacitor C3N and an auxiliary switch Sa3N (e.g. auxiliary module ARM31 comprises the clamping capacitor C31 and the auxiliary switch Sa31). In one embodiment of the present invention, each auxiliary switch Sa3N comprises an anti-parallel diode and the voltage of each clamping capacitor C3N is vc3N (e.g. the voltage of the clamping capacitor C31 is vc31), wherein each auxiliary switch Sa3N receives an auxiliary switching signal ga3N (e.g. the auxiliary switch signal ga31 is configured to control the auxiliary switch Sa31). The voltage sensing circuit 50 is configured to sample the voltages vc31~vc3N of the clamping capacitors C31~C3N and correspondingly generate voltage sensing signals vc31'~vc3N'. The control circuit 60 is configured to receive the voltage sensing signals vc31'~vc3N', and correspondingly generate the auxiliary switch signals ga31~ga3N according to the voltage sensing signals vc31'~vc3N' and the second dead time to respectively control the auxiliary switches Sa31~Sa3N. In one embodiment of the present invention, when a certain voltage sensing signal vc3i' is ranks at top P among the voltage sensing signals vc31'~vc3N', the control circuit 60 is configured to control the auxiliary switch Sa3i corresponding to the certain voltage sensing signal vc3i' keeping on for at least a third predetermined time during the second dead time wherein the third predetermined time is less than or equal to the second dead time and not limited to the second dead time, and P is a natural number greater than or equal to one. The third predetermined time can be equal to the first predetermined time and the natural number P can be equal to the natural number M. In one embodiment of the present invention, the auxiliary switch Sa3i can utilize the freewheeling current during the second dead time to discharge the corresponding clamping capacitor C3i.

FIG. 4(b) schematically illustrates a circuit diagram of the fourth bridge arm 40 in the full bridge circuit 2000 with series-connected switches. The fourth bridge arm 40 comprises N series-connected main switches S41~S4N. The first main switch signal g is configured to control the N main switches S41~S4N. An auxiliary module ARM4N is connected in parallel with each main switch S4N (e.g. the auxiliary module ARM41 is connected in parallel with the main switch S41, and the auxiliary module ARM42 is connected in parallel with the main switch S42). Each auxiliary module ARM4N comprises a clamping capacitor C4N and an auxiliary switch Sa4N (e.g. auxiliary module ARM41 comprises the clamping capacitor C41 and the auxiliary switch Sa41). In one embodiment of the present invention, each auxiliary switch Sa4N comprises an anti-parallel diode and the voltage of each clamping capacitor C4N is vc4N (e.g. the voltage of the clamping capacitor C41 is vc41), wherein each auxiliary switch Sa4N receives an auxiliary switching signal ga4N (e.g. the auxiliary switch signal ga41 is configured to control the turn-on and turn-off of the auxiliary switch Sa41). The voltage sensing circuit 50 is configured to sample the voltages vc41~vc4N of the clamping capacitors C41~C4N and correspondingly generate voltage sensing signals vc41'~vc4N'. The control circuit 60 is configured to receive the voltage sensing signals vc41'~vc4N', and correspondingly generate the auxiliary switch signals ga41~ga4N according to the voltage sensing signals vc41'~vc4N' and the first dead time to respectively control the auxiliary switches Sa41~Sa4N. In one embodiment of the present invention, when a certain voltage sensing signal vc4i' ranks at top Q among the voltage sensing signals vc41'~vc4N', the control circuit 60 is configured to control the auxiliary switch Sa4i corresponding to the certain voltage sensing signal vc4i' keeping on for at least a fourth predetermined time during the first dead time wherein the fourth predetermined time is less than or equal to the first dead time and not limited to the first dead time, and Q is a natural number greater than or equal to one. The fourth predetermined time can be equal to the first predetermined time and the natural number Q is equal to or unequal to the natural number M. In one embodiment of the present invention, the auxiliary switch Sa4i utilizes the freewheeling current during the first dead time to discharge the corresponding clamping capacitor C4i.

In other embodiments of the present invention, the first bridge arm 10, the second bridge arm 20, the third bridge arm 30, or the fourth bridge arm 40 may also comprise only one main switch (e.g. the first bridge arm 10 comprising multiple main switches connected in series, but the second bridge arm 20, the third bridge arm 30, and the fourth bridge arm 40 only comprising one main switch). In this case, the control circuit 60 can no longer perform the voltage balance control on the bridge arm with only one main switch. In the embodiment shown in FIG. 1 and FIG. 3, the first bridge arm 10, the second bridge arm 20, the third bridge arm 30 and the fourth bridge arm 40 may comprise different number series-connected main switches. The main switch can be a power device with reverse freewheeling capability (e.g. IGBT, IGCT or MOSFET) or it can be a power device without reverse freewheeling capability but externally connected an anti-parallel diode. In one embodiment of the present invention, the capacitance of the clamp capacitor is much larger than that of the corresponding drain-source (or collector-emitter) parasitic capacitor of the main switch. In one embodiment of the present invention, the auxiliary switch comprises an anti-parallel diode, which can be an anti-parallel body diode of the auxiliary switch, or an external anti-parallel diode.

Figure 5:
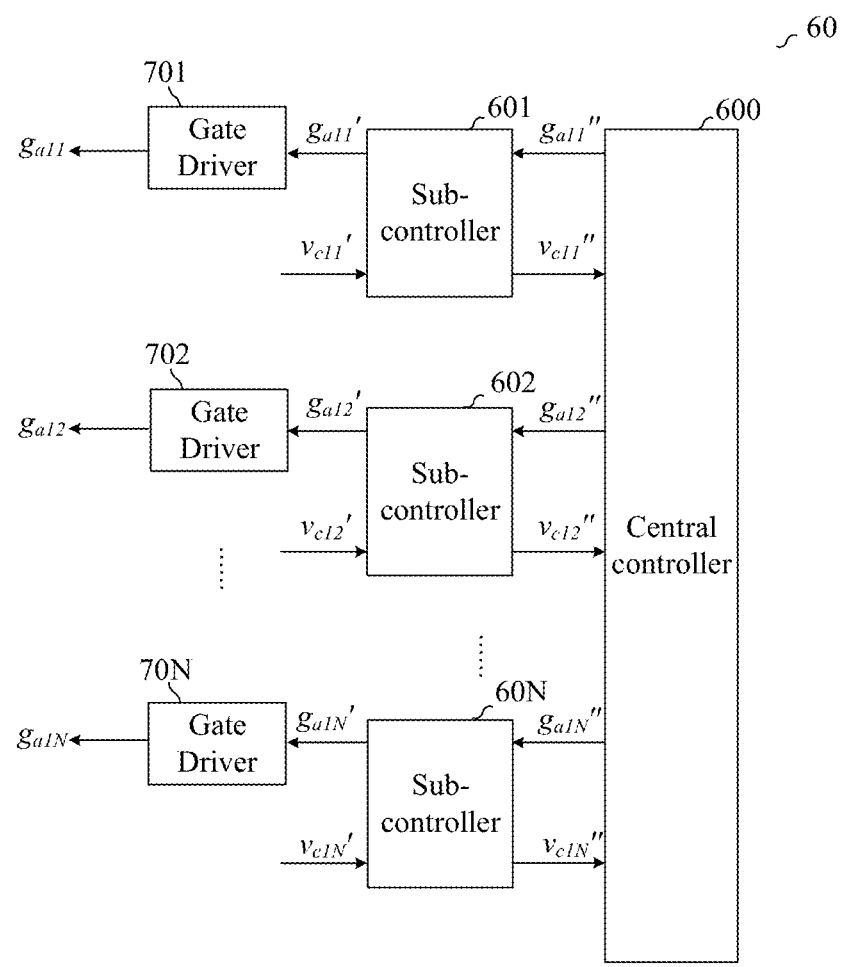
FIG. 5 schematically illustrates a circuit diagram of a control circuit 60 in accordance with an embodiment of the present invention.

FIG. 5 schematically illustrates a circuit diagram of a control circuit 60 shown in FIG. 1 in accordance with an embodiment of the present invention. The control circuit comprises N sub-controllers 601-60N and a main controller 600. In an embodiment of the present invention, the sub-controllers 601-60N and the central controller 600 can be FPGA (Field Programmable Gate Array) chips and the optical fiber communication can be adopted between the sub-controllers 601-60N and the central controller 600. Each sub-controller 60i is configured to correspondingly receive the voltage sensing signal vc1i' and transmit it to the main controller 600. The main controller 600 is configured to correspondingly receive the voltage sensing signals vc11'-vc1N' from the sub-controllers 601-60N and configured to sort the voltage sensing signals vc11'-vc1N' according to their values. Then, the main controller 600 is configured to send turn-on instruction signals to ones of the plurality of sub-controllers corresponding to the voltage sensing signals ranking the top M among the voltage sensing signals and send turn-off instruction signals to rest of the plurality of sub-controllers. The sub-controller 60i receiving the turn-on instruction signal is configured to correspondingly generate a gate drive signal ga1i' to the gate drive circuit 70i, and the gate drive circuit 70i is configured to correspondingly generate a turn-on signal ga1i to turn on the auxiliary switch Sa1i. The sub-controller receiving the turn-off instruction signal is configured to correspondingly generate a gate drive signal to the gate drive circuit, and the gate drive circuit is configured to correspondingly generate a turn-off signal to turn off the auxiliary switch. In one embodiment of the present invention, the turn-on instruction comprises a turn-on duration and a turn-on moment, which are generated according to the first dead time or the second dead time.

Note that the embodiment shown in FIG. 5 only illustrates the control circuit corresponding to the first bridge arm 10. Other control circuits and methods (such as the second bridge arm 20, the third bridge arm 30 and the fourth bridge arm 40) are similar to the embodiment shown in FIG. 5.

Figure 6:
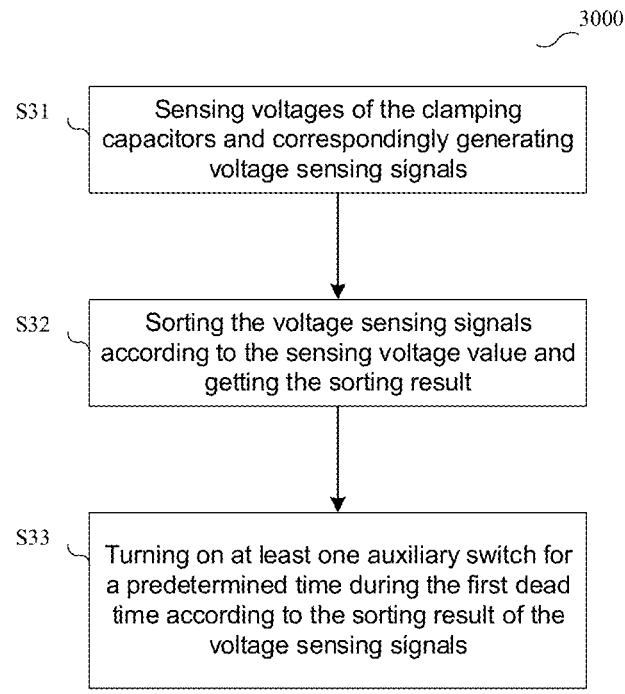
FIG. 6 is a flow chart of a control method 3000 used in a bridge circuit with series-connected switches in accordance with an embodiment of the present invention.

FIG. 6 is a flow chart of a control method 3000 for a bridge circuit with series-connected switches in accordance with an embodiment of the present invention. It comprises steps S31~S33. The bridge circuit comprises a first bridge arm and a second bridge arm. The first bridge arm comprises a plurality of series-connected first main switches. Each of the plurality of series-connected first main switches is coupled in parallel with a first auxiliary module. Each first auxiliary module comprises a first clamping capacitor and a first auxiliary switch. The second bridge arm comprises at least a second main switch. The first bridge arm is configured to receive a first main switch signal to control the plurality of first main switches and the second bridge arm is configured to receive a second main switch signal to control the at least a second main switch. A working cycle of the bridge circuit comprises a first dead time, during the first dead time, the plurality of series-connected first main switches and the at least a second main switch are off.

At step S31, sensing voltages of the clamping capacitors and correspondingly generating voltage sensing signals.

At step S32, sorting the voltage sensing signals according to the sensing voltage value and getting the sorting result.

At step S33, turning on at least one auxiliary switch for a predetermined time during the first dead time according to the sorting result, wherein the predetermined time is equal to or less than the first dead time.

In an embodiment of the present invention, when certain first voltage sensing signals rank at top M among the first voltage sensing signals, the auxiliary switches corresponding to the certain voltage sensing signal are controlled to turn on, while the other auxiliary switches are controlled to turn off, wherein M is a natural number greater than or equal to one. In an embodiment of the present invention, at least one of the first auxiliary switches turns on, and discharges the first clamping capacitor corresponding to the first auxiliary switch in the first dead time by the freewheeling current. I.e., turning on the first auxiliary switches corresponding to certain first voltage sensing signals ranking on top M among the first voltage sensing signals for the predetermined time, wherein M is a natural number greater than or equal to one.

In an embodiment of the present invention, the common node is configured to output an output current and an output voltage. During a working cycle, when the output current lags behind the output voltage, the first dead time is the dead time before the rising edge of the first main switch signal, and the second dead time is the dead time before the rising edge of the second main switch signal. When the output current leads the output voltage, the first dead time is the dead time before the rising edge of the second main switch signal, and the second dead time is the dead time before the rising edge of the first main switch signal.

Figure 7:
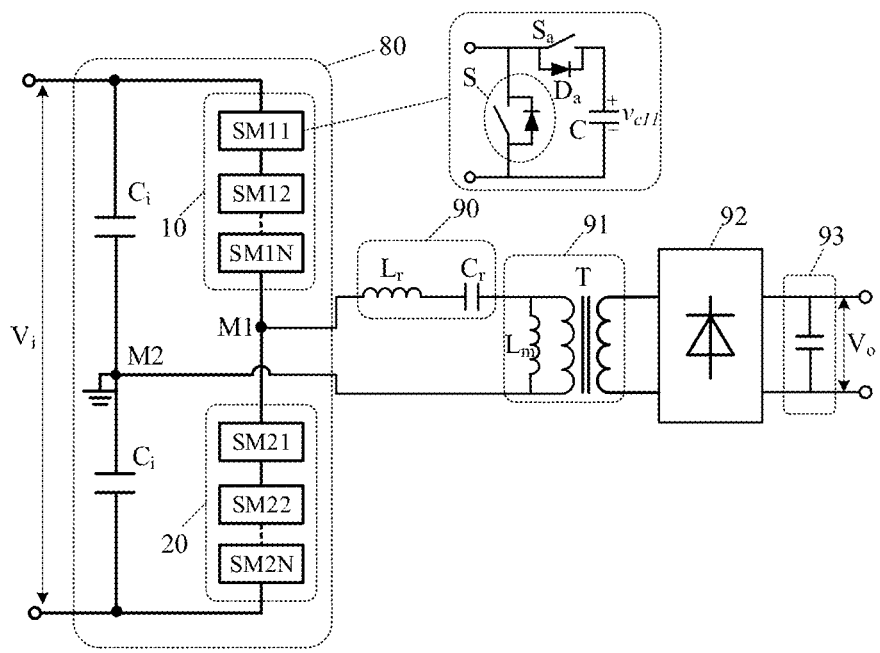
FIG. 7 schematically illustrates a circuit diagram of a bridge circuit with series-connected switches coupled in a resonant circuit (i.e. an LLC resonant circuit with series-connected switches) in accordance with an embodiment of the present invention.

FIG. 7 schematically illustrates a circuit diagram of a bridge circuit with series-connected switches (i.e. an LLC resonant circuit) coupled in a resonant circuit in accordance with an embodiment of the present invention. The LLC resonant circuit comprises a bridge circuit 80, a resonant network 90, a transformer 91, a rectifier 92 and an output capacitor 93. The bridge circuit 80 comprises two bridge arm capacitors Ci and a half bridge circuit with series-connected switches as shown in FIG. 1. The half bridge circuit comprises a first bridge arm 10 and a second bridge arm 20. The midpoints M1 and M2 of the two bridge arms of the bridge circuit 80 are coupled to the primary side of the transformer 91 via the resonant network 90. The resonant network 90 comprises an inductor Lr and a capacitor Cr. The rectifier 40 and the output capacitor 50 are located on the secondary side of the transformer 30. The rectifier can be a full-bridge rectifier circuit, a half-bridge rectifier circuit or a voltage-doubling rectifier circuit. Vi and Vo are the input voltage and the output voltage of the LLC resonant circuit, respectively. In the embodiment shown in FIG. 7, to simplify the description, each main switch and its parallel auxiliary module are defined as a submodule. That is, the first bridge arm 10 comprises submodules SM11~SM1N connected in series and the second bridge arm 20 comprises submodules SM21~SM2N connected in series. Each submodule SM1i and SM2i comprises a main switch S, an auxiliary diode Da, an auxiliary switch Sa, and a clamping capacitor C. Each main switch S is coupled in parallel with an auxiliary module, each auxiliary module comprises a clamping capacitor C and an auxiliary switch Sa. The auxiliary switch Sa is coupled in anti-parallel with the auxiliary diode Da. The two output ports of each submodule are the drain/source (or collector/emitter) of the main switch S. The submodule has the following characteristics: when the auxiliary switching Sa turns off, the clamping capacitor C can only be charged via the auxiliary diode Da; when the auxiliary switch turns on, the clamping capacitor can be discharged or charged. To simplify the description, the components in each submodule are not numbered differently. However, in an actual embodiment of the present invention, the structure of the first bridge arm 10 shown in FIG. 7 and the label of each components are the same as the first bridge arm 10 shown in FIG. 2(a), and the structure of the second bridge arm 20 shown in FIG. 7 and the label of each components are the same as the second bridge arm 20 shown in FIG. 2(b). In the embodiment shown in FIG. 7, in each submodule SM1i and SM2i, when the main switch S turns off, once the voltage across S exceeds that of the clamping capacitor C, the auxiliary diode Da will conduct. Since the capacitance of the clamp capacitor C is much larger than the parasitic capacitance of the main switch S, the voltage of the main switch S is clamped to the voltage of the capacitor C. Therefore, the voltages can be shared evenly among the series-connected main switches if the voltages of the clamping capacitors are well-balanced.

Figure 8:
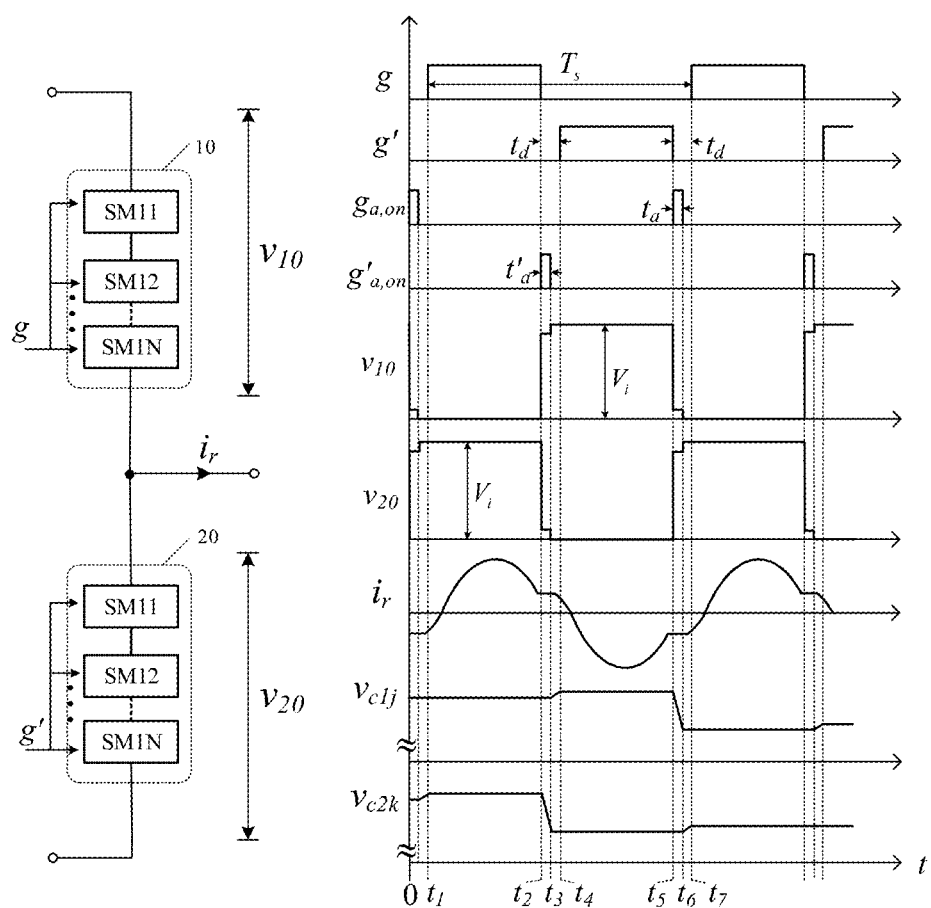
FIG. 8 illustrates working waveforms of the LLC resonant circuit with series-connected switches shown in FIG. 7 in accordance with an embodiment of the present invention.

FIG. 8 illustrates working waveforms of the bridge circuit with series-connected switches coupled in the resonant circuit in accordance with an embodiment of the present invention. Wherein Vi is the input voltage of the LLC resonant circuit, v10 and v20 are the bridge arm voltage of the first bridge arm 10 and the second bridge arm 20, respectively, it is the resonant current, Ts is the switching cycle of each main switch, td is the dead time between the first main switch signal g and the second main switch signal g'. In the embodiment shown in FIG. 8, the first dead time is the dead time before the rising edge of the first main switch signal g, and the second dead time is the dead time before the rising edge of the second main switch signal g'. ga,on and g'a,on are the pulse gate signals of the auxiliary switch in the first bridge arm 10 and the second bridge arm 20, respectively. In each switching cycle, the pulse signals ga,on and g'a,on maintain a high level for a predetermined time and remains low for the rest of the time during the first dead time and the second time, respectively. In an embodiment shown in FIG. 8, the pulse gate signal ga,on (g'a,on) are assigned to one auxiliary switch in the first (second) bridge arm respectively, and the gate signals of other auxiliary switches are off signals (that is, low level); in other embodiments of the present invention, the pulse signal ga, on (g'a, on) can also be assigned to two or more than two auxiliary switches in the first (second) bridge arm, and the gate signals of other auxiliary switches are off signals (that is, low level). The high level duration of pulse gate signal ga,on and g'a,on is ta and t'a, respectively. In the embodiment in FIG. 8, ta=t'a, and ta<td, where the values of ta and t'a can be adjusted according to circuit parameters and the dead time td can be set according to practical needs. In other embodiment of the present invention, ta is equal or unequal to t'a. In one embodiment of the present invention, the dead time td should ensure the main switch realize zero voltage switching-on.

In the embodiment shown in FIG. 8, t1 represents the start moment of a switching cycle, at which moment the first main switch signal g steps from low level to high level. t2 represents the start moment of the second dead time in this switching cycle, at which moment the first main switch signal g steps from high level to low level and the pulse gate signal g'a,on steps from low level to high level. t3 represents the moment when the pulse gate signal g'a,on steps from high level to low level. t4 represents the end moment of the second dead time in this switching period, at which moment the second main switch signal g' steps from low level to high level. In other embodiment of the present invention, the rising edge of the pulse gate signal g'a,on is not limited in the second dead time, and can be ahead of the falling edge of the first main switch signal g. t5 represents the start moment of the first dead time in this switching period, at which moment the second main switch signal g' steps from high level to low level and the pulse gate signal ga,on steps from low level to high level. t6 represents the moment when the pulse gate signal ga,on steps from high level to low level. In other embodiment of the present invention, the rising edge of the pulse gate signal ga,on is not limited in the first dead time, and can be ahead of the falling edge of the second main switch signal g'. t7 represents the end moment of this switching period, at which moment the first main switch signal g steps from low level to high level. In the switching cycle from t1 to t7, the submodule which obtains the pulse gate signal ga,on in the first bridge arm 10 is SM1$j$, and vc1$j$ represents the voltage of the clamping capacitor in the submodule SM1$j$, while the submodule which obtains the pulse gate signal g'a,on in the second bridge arm 20 is SM2$k$, and vc2$k$ represents the voltage of the clamping capacitor in the submodule SM2$k$, wherein j and k can represent any natural number from 1 to N. In the waveforms shown in FIG. 8, the clamping capacitor voltages (vc1$j$ and vc2$k$) are amplified to show the operating characteristics of the circuit in the embodiment. In actual working conditions, the voltage fluctuation of the clamp capacitor is affected by the capacitance of the clamping capacitor C.

Figure 9:
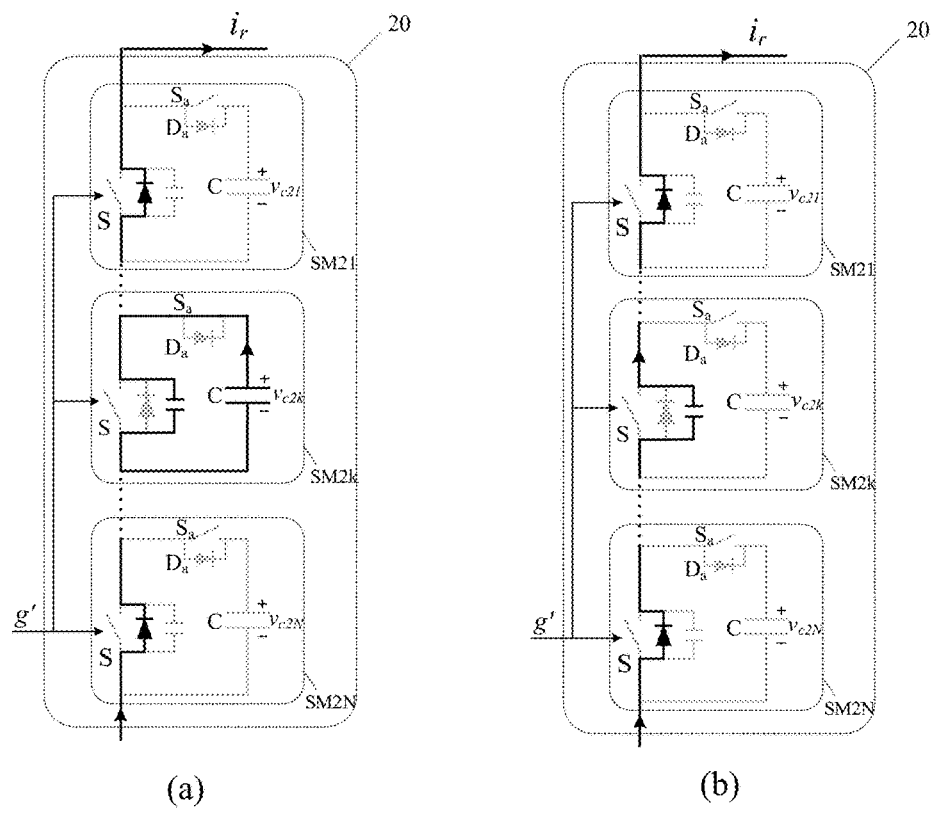
FIG. 9 is a circuit modal diagram of the second bridge arm 20 within a second dead time in the waveforms shown in FIG. 8 in accordance with an embodiment of the present invention.

FIG. 9 is a circuit modal diagram of the second bridge arm 20 during the second dead time in the waveforms shown in FIG. 8 in accordance with an embodiment of the present invention. FIG. 9($a$) is a circuit modal diagram of the second bridge arm 20 during the period when the pulse gate signal g'a,on maintains a high level during the second dead time, corresponding to t2~t3 in a second dead time (t2~t4); wherein from t2 to t3, when the main switch S in the first bridge arm 10 turns off, its parasitic capacitor is charged quickly, and the parasitic capacitor of the main switch S in the second bridge arm 20 is discharged. Because the auxiliary switch Sa in the submodule SM2$k$ in the second bridge arm 20 turns on, the clamping capacitor C in the submodule SM2$k$ is in parallel with the parasitic capacitor of the corresponding main switch S, which are discharged at the same time until the auxiliary switch Sa in the submodule SM2$k$ turns off. Since the capacitance of the clamping capacitor C is much larger than the parasitic capacitance of the main switch S, the freewheeling current of the bridge arm mainly flows through the clamping capacitor C, while the voltages of parasitic capacitors of the remaining submodules are quickly discharged to 0. The freewheeling current of the bridge arm is transferred to the anti-parallel diode of the corresponding main switch S to ensure zero voltage switch-on of the corresponding main switch S. Since the clamping capacitor in the submodule SM2$k$ is inserted into the second bridge arm 20 and the parasitic capacitors voltages of the main switches S in the remaining submodules are discharged to 0, the voltage v20 of the second bridge arm 20 is equal to the clamping capacitor voltage vc2$k$ (ignoring the conduction voltage drop of anti-parallel diode of the main switch S and the auxiliary switch Sa in each submodule), while the voltage v10 of the first bridge arm 10 is equal to the difference between the input voltage Vi and vc2$k$.

FIG. 9($b$) is a circuit modal diagram of the second bridge arm 20 during the period when the pulse gate signal g'a,on maintains a low level during the second dead time, corresponding to t3~t4 in a second dead time (t2~t4); wherein from t3 to t4, the auxiliary switch Sa in the submodule SM2$k$ turns off, and the parasitic capacitor of the main switch S in the submodule SM2$k$ is discharged by the freewheeling current of the bridge arm. By designing the duration of this stage (td-ta) reasonably, the parasitic capacitor of the main switch S in the submodule SM2$k$ will be discharged to 0 at the end of this stage, realizing zero voltage switch-on of the main switch S. When the parasitic capacitor of the main switch S in the submodule SM2$k$ is discharged, the parasitic capacitor of the main switch S in the first bridge arm 10 continues to be charged to maintain the sum of the voltage v10 and the voltage v20 equal to the input voltage Vi. When the voltage of the parasitic capacitor in any submodule in the first bridge arm 10 is higher than the voltage of its corresponding clamping capacitor C, the auxiliary diode Da in the corresponding submodule conducts and the clamping capacitor C is charged until the arm current of the first bridge arm 10 drops to zero.

Figure 10:
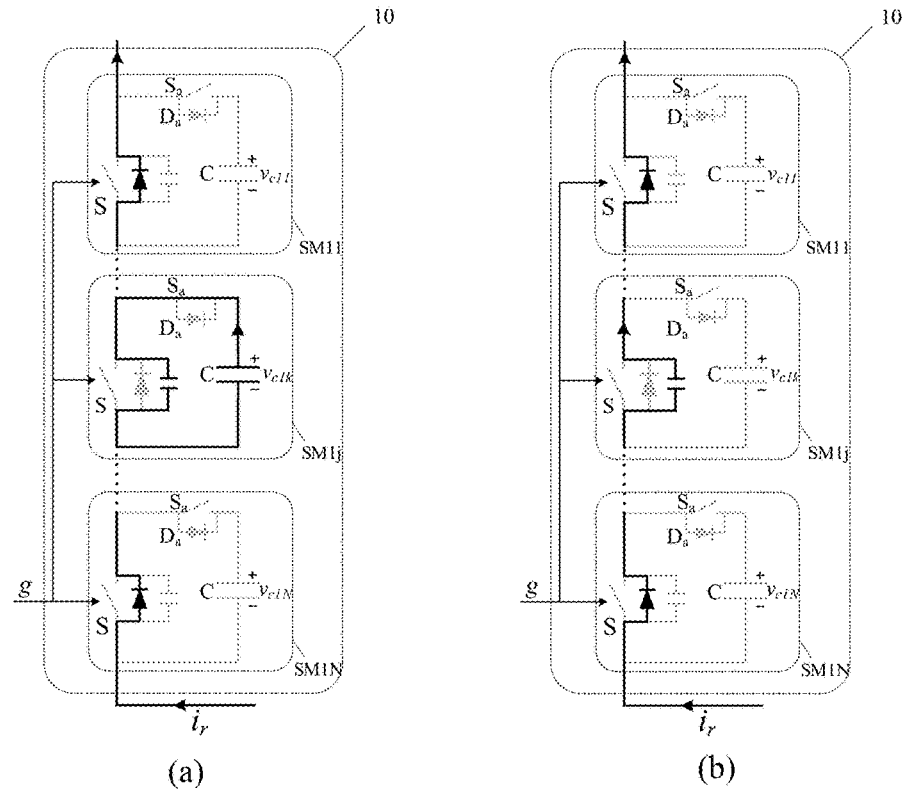
FIG. 10 is a circuit modal diagram of the first bridge arm 10 within a first dead time in the waveforms shown in FIG. 8 in accordance with an embodiment of the present invention.

FIG. 10 is a circuit modal diagram of the first bridge arm 10 during the first dead time in the waveforms shown in FIG.

8 in accordance with an embodiment of the present invention. FIG. 10(a) is a circuit modal diagram of the first bridge arm 10 during the period when the pulse gate signal ga,on maintains a high level in the first dead time, corresponding to t5~t6 in the first dead time (t5~t7); wherein from t5 to t6, when the main switch S in the second bridge arm 20 turns off, its parasitic capacitor is charged quickly, and the parasitic capacitor of the main switch S in the first bridge arm 10 is discharged. Because the auxiliary switch Sa in the submodule SM1j in the first bridge arm 10 turns on, the clamping capacitor C in the submodule SM1j is in parallel with the parasitic capacitance of the corresponding main switch S, which are discharged at the same time until the auxiliary switch Sa in the submodule SM1j turns off. Since the capacitance of the clamping capacitor C is much larger than the parasitic capacitance of the main switch S, the freewheeling current of the bridge arm mainly flows through the clamping capacitor C, while the voltages of parasitic capacitors in the remaining submodules of the first bridge 10 are quickly discharged to 0. The freewheeling current of the bridge arm is transferred to the anti-parallel diode of the corresponding main switch S to ensure zero voltage switch-on of the corresponding main switch S. Since the clamping capacitor in the submodule SM1j is inserted into the first bridge arm 10, and the parasitic capacitors of the main switches S in the remaining submodules are discharged to 0, the voltage v20 of the first bridge arm 10 is equal to the clamping capacitor voltage vc1j (ignoring the conduction voltage drop of anti-parallel diode of the main switch S and the auxiliary switch Sa in each submodule), while the voltage v20 of the second bridge arm 20 is equal to the difference between the input voltage Vi and vc1j.

FIG. 10(b) is a circuit modal diagram of the first bridge arm 10 during the period when the pulse gate signal ga,on maintains a low level during the first dead time, corresponding to t6~t7 in the first dead time (t5~t7); wherein from t6 to t7, the auxiliary switch Sa in the submodule SM1j turns off, and the parasitic capacitor of the main switch S in the submodule SM1j is discharged by the freewheeling current of the bridge arm. By designing the duration of this stage (td-ta) reasonably, the parasitic capacitor of the main switch S in the submodule SM1j will be discharged to 0 at the end of this stage, realizing zero voltage switch-on of the main switch S. When the parasitic capacitor of the main switch S in the submodule SM1j is discharged, the parasitic capacitor of the main switch S in the second bridge arm 20 continues to be charged to maintain the sum of the voltage v10 and the voltage v20 equal to the input voltage Vi. When the voltage of the parasitic capacitor in any submodule in the second bridge arm 20 is higher than the voltage of its corresponding clamping capacitor C, the auxiliary diode Da in the corresponding submodule conducts and the clamping capacitor C is charged until the arm current of the second bridge arm 20 drops to zero.

Figure 11:
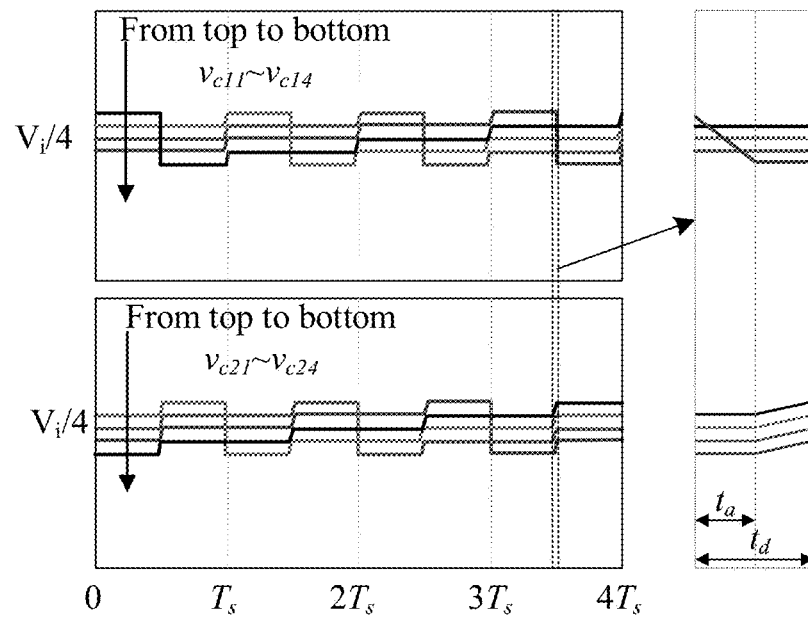
FIG. 11 illustrates working waveforms of the clamping capacitors voltage when the LLC resonant circuit is in steady state (taking 4 series-connected switches in each arm as an example) in accordance with an embodiment of the present invention.

FIG. 11 illustrates working waveforms of the clamping capacitors voltage when the LLC resonant circuit is in steady state in accordance with an embodiment of the present invention. In the steady-state waveform shown in FIG. 11, at the end of a switching period (0-Ts), the clamping capacitor voltage vc12 in the sub-module SM12 is the highest in the first bridge arm 10. In the next switching period (Ts~2Ts), during the dead time before the main switch in the first bridge arm 10 turns on, the auxiliary switch Sa in the auxiliary module SM12 turns on for a predetermined time ta and its corresponding clamping capacitor C is discharged. As a result, the clamping capacitor voltage vc12 decreases, while the voltages of other clamping capacitors in the first bridge arm 10 remain unchanged. If ta is set properly, at the end of this discharge process, there will be:

$$v_{c11}+v_{c12}+v_{c13}+v_{c14}<V_i$$

During the dead time after the main switch in the first bridge arm 10 turns off, the voltage v10 of the first bridge arm 10 rises gradually and will eventually be equal to the input voltage Vi, but the sum of the clamping capacitor voltages in the first bridge arm 10 is less than the input voltage Vi. As a result, during the dead time after the main switch in the first bridge arm 10 turns off, there is a charging process for all the clamping capacitors C in the first bridge arm 10. Then, when the entire switching cycle Ts~2Ts ends, the original highest clamping capacitor voltage vc12 in the first bridge arm 10 decreases, while the original lower clamping capacitor voltages vc11, vc13, and vc14 increase, which means the imbalance among AM capacitor voltages is compensated. Using the voltage balance control method described in FIG. 11, a similar compensation also exists in the second bridge arm 20 and continues in every switching cycle, finally achieving that the clamping capacitor voltages in each bridge arm dynamically balanced around Vi/4. The voltage fluctuation of the clamping capacitor is affected by the number of sub-modules N in each bridge arm and the pulse duration ta of the auxiliary switch Sa. The dashed box in FIG. 11 shows the waveforms of the clamping capacitor voltages vc11~vc1N and vc21~vc2N during the dead time in detail, which is consistent with the working principle discussed in FIG. 8.

Figure 12:
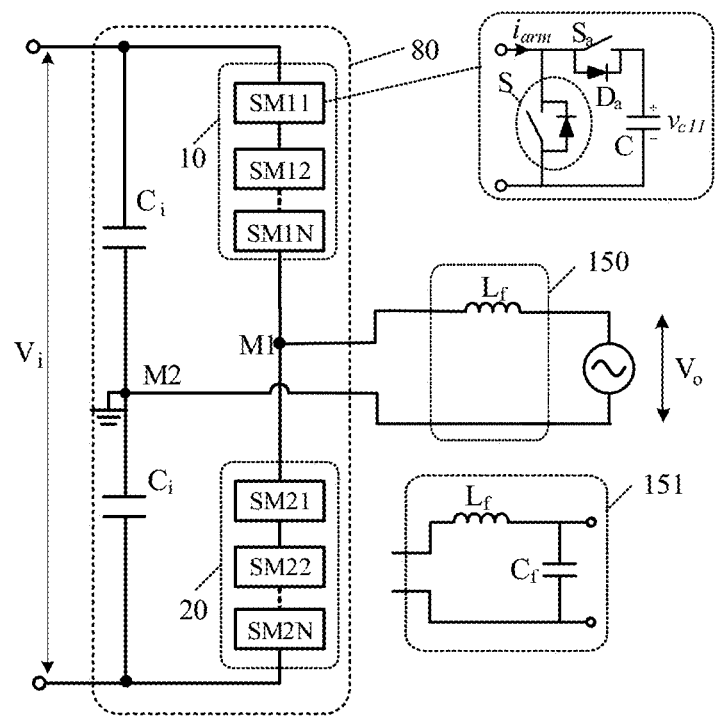
FIG. 12 schematically illustrates a circuit diagram of a bridge circuit with series-connected switches coupled in an inverter circuit (i.e. an inverter circuit with series-connected switches) in accordance with an embodiment of the present invention.

FIG. 12 schematically illustrates a circuit diagram of a bridge circuit with series-connected switches coupled in an inverter circuit in accordance with an embodiment of the present invention. The inverter circuit comprises a bridge circuit 80 and a filter inductor 150 or filter 151. The bridge circuit 80 comprises two bridge arm capacitors Ci and a half bridge circuit with series-connected switches as shown in FIG. 1. The half bridge circuit comprises a first bridge arm 10 and a second bridge arm 20. The midpoints M1 and M2 of the two bridge arms of the bridge circuit 80 are coupled to the load via the filter inductor 150 or the filter 151. The load can be an ac source such as a power grid, a motor, or a heating device. The low-pass filter 151 comprises a filter inductor Lf and a filter capacitor Cf. Vi and Vo are the input voltage and the output voltage of the inverter circuit, respectively. In the embodiment shown in FIG. 12, to simplify the description, each main switch and its parallel auxiliary module are defined as a submodule, that is, the first bridge arm 10 comprises submodules SM11~SM1N connected in series and the second bridge arm 20 comprises submodules SM21~SM2N connected in series. Each submodule SM1i and SM2i comprises a main switch S, an auxiliary diode Da, an auxiliary switch Sa, and a clamping capacitor C. Each main switch S is coupled in parallel with an auxiliary module, each auxiliary module comprises a clamping capacitor C and an auxiliary switch Sa. The auxiliary switch Sa is coupled in anti-parallel with the auxiliary diode Da. The two output ports of each submodule are the drain/source (or collector/emitter) of the main switch S. iarm is the bridge arm current, and the direction shown in FIG. 12 is positive. The submodule has the following characteristics: when the auxiliary switching Sa turns off, the clamping capacitor C can only be charged via the auxiliary diode Da and cannot be discharged; only when the auxiliary switching turns on and the bridge arm current iarm<0, the clamping capacitor can be discharged. To simplify the description, the components in each submodule are not numbered differently.

However, in an actual embodiment of the present invention, the structure of the first bridge arm 10 shown in FIG. 12 and the label of each component are the same as the first bridge arm 10 and the second bridge arm 20 shown in FIG. 2(a) and FIG. 2(b), respectively.

Figure 13:
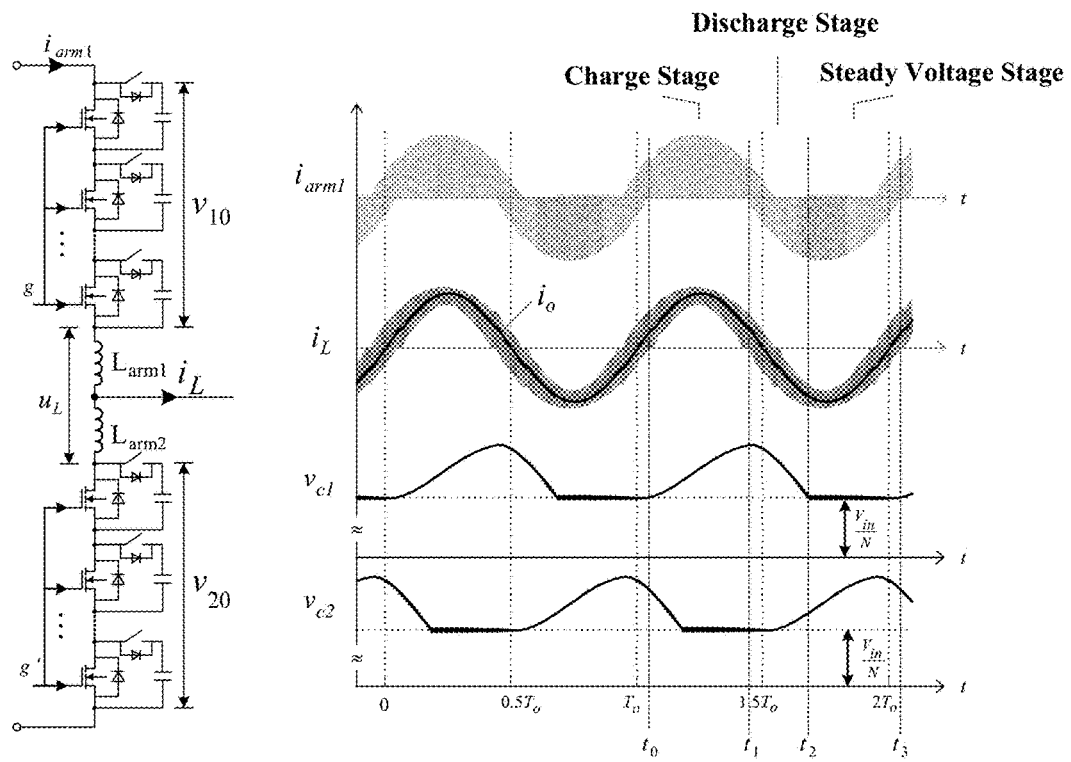
FIG. 13 illustrates working waveforms of the inverter circuit with series-connected switches shown in FIG. 12 in two output ac cycles in accordance with an embodiment of the present invention.

FIG. 13 illustrates working waveforms of the bridge circuit with series-connected switches coupled in the inverter circuit in two output ac cycles in accordance with an embodiment of the present invention. Wherein Vi is the input voltage of the inverter circuit, v10 and v20 are the bridge arm voltage of the first bridge arm 10 and the second bridge arm 20, respectively, iL is the current of the filter inductor, io is the output ac current, To is the period of the output ac current, iarm1 is the current flowing through the first bridge arm, vc1 and vc2 are the voltages of the clamping capacitors C of the submodules SM11~SM1N in the first bridge arm 10 and the submodules SM21~SM2N in the second bridge arm 20, respectively. The first main switch signal g and the second main switch signal g' adopt bipolar SPWM modulation (the modulation frequency is much larger than the output ac frequency). In order to avoid punch-through of the first bridge arm 10 and the second bridge arm 20, there is a dead time td between the first main switch signal g and the second main switch signal g'. The definition of the first dead time, the second dead time, the pulse gate signal ga,on and g'a,on of the auxiliary switch in the first bridge arm 10 and the second bridge arm 20 are the same as that of the LLC resonant circuit shown in FIG. 8. Based on the charging and discharging state of the clamping capacitors C of the submodules SM11~SM1N in the first bridge arm 10, an output ac cycle is divided into 3 stages: Charge Stage t0~t1, Discharge Stage t1~t2 and Steady Voltage Stage t2~t3. The charging and discharging state of the clamping capacitors C of the submodules SM21~SM2N in the second bridge arm 20 are similar to that of the first bridge arm 10, which is also divided into three stages, and not repeated here. In actual working conditions, the voltage fluctuation of the clamp capacitor is affected by the capacitance of the clamping capacitor C.

Figure 14:
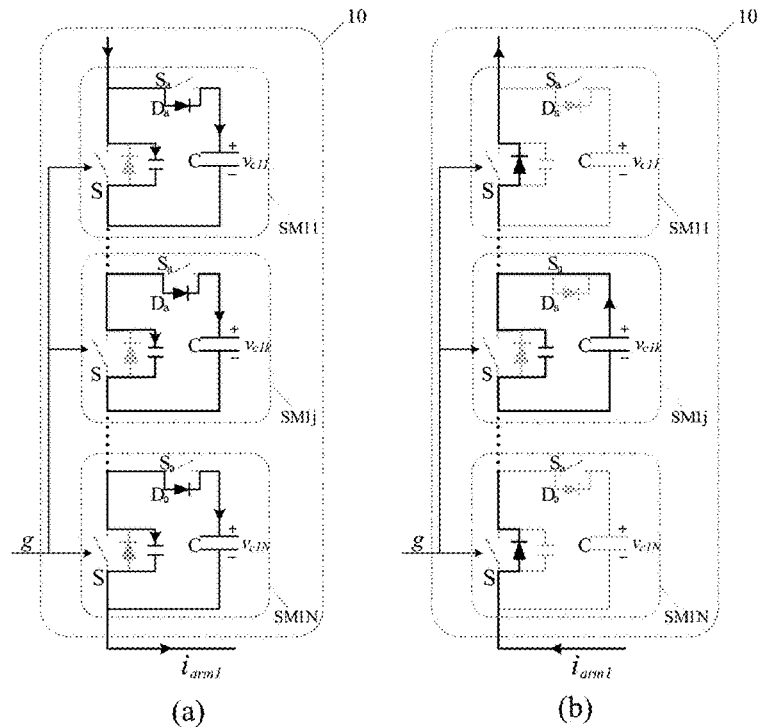
FIG. 14 is a circuit mode diagram of the first bridge arm 10 in each stage of the working waveform shown in FIG. 13 in accordance with an embodiment of the present invention.

FIG. 14(a) is a circuit modal diagram of the first bridge arm 10 in the Charge Stage in the waveforms shown in FIG. 13 according to an embodiment of the present invention, in which period iarm1>0. FIG. 14(a) is a circuit modal diagram of the first bridge arm 10 during the period when the pulse gate signal g'a,on maintains a high level with in the second dead time, corresponding to t2~t3 in the second dead time (t2~t4) shown in FIG. 8; wherein from t2 to t3, iarm1>0, iL>0. When the main switch S in the first bridge arm 10 turns off, due to the inevitable parasitic inductances Larm1 and Larm2 of the first bridge arm 10 and the second bridge arm 20, the filter inductor current iL cannot be transferred from the first bridge arm 10 to the second bridge arm 20 immediately and the parasitic capacitor of the main switch S in the first bridge arm 10 is charged quickly by the freewheeling current of the parasitic inductance Larm1 of the first bridge arm 10. Since the capacitance of the clamping capacitor C is much larger than the parasitic capacitance of the main switch S, the current iarm1 of the first bridge arm 10 continues to charge the clamping capacitor C until iarm1 drops to zero. Thus, the voltages of the clamping capacitors C of all submodules SM11~SM1N in the first bridge arm 10 keep rising in the Charge Stage. After several switching cycles, when iarm1<0, the clamping capacitors C of the submodules SM11~SM1N in the first bridge arm 10 can be discharged and the inverter circuit enters the Discharge Stage.

FIG. 14(b) is a circuit modal diagram of the first bridge arm 10 in the Discharge Stage in the waveforms shown in FIG. 13 according to an embodiment of the present invention, in which period iarm1<0. FIG. 14(b) is a circuit modal diagram of the first bridge arm 10 during the period when the pulse gate signal ga,on maintains a high level during the first dead time, corresponding to t5~t6 in the first dead time (t5~t7) shown in FIG. 8; wherein from t5 to t6, since iarm1<0 and the main switch S in the second bridge arm 20 is off, its parasitic capacitor charges quickly, while the parasitic capacitor of the main switch in the first bridge arm 10 discharges. Because the auxiliary switch Sa in the submodule SM1j in the first bridge arm 10 turns on, the clamping capacitor C in the submodule SM1j is coupled in parallel with the parasitic capacitor of the corresponding main switch S, which are discharged at the same time until the auxiliary switch Sa in the submodule SM1j turns off. Since the capacitance of the clamping capacitor C is much larger than the parasitic capacitance of the main switch S, the freewheeling current of the bridge arm mainly flows through the clamping capacitor C, while the voltages of parasitic capacitors in the remaining submodules of the first bridge 10 are quickly discharged to 0. The freewheeling current transfers to the anti-parallel diode of the corresponding main switch S to ensure the zero voltage switching-on of the corresponding main switch S. Since the clamping capacitor in the submodule SM1j is inserted into the first bridge arm 10, and the parasitic capacitors of the main switches S in the remaining submodules are discharged to 0, the voltage v10 of the first bridge arm 10 is equal to the clamping capacitor voltage vc1j (ignoring the conduction voltage drop of anti-parallel diode of the main switch S and the auxiliary switch Sa in each submodule), while the voltage v20 of the second bridge arm 20 is equal to the difference between the input voltage Vi and vc1j. This Discharge Stage ends until the voltage of each clamping capacitor in the bridge arm 10 drops to around Vi/4.

Figure 15:
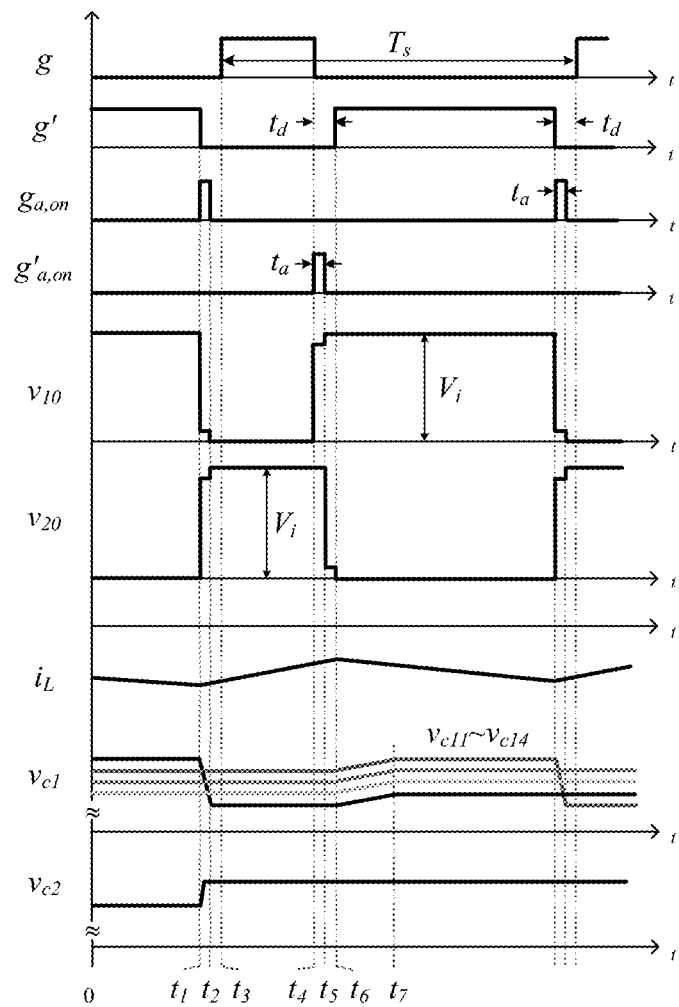
FIG. 15 illustrates working waveforms of the inverter circuit with series-connected switches in the Steady Voltage Stage shown in FIG. 13 in accordance with an embodiment of the present invention.

FIG. 15 illustrates working waveforms of the inverter circuit with series-connected switches in the Steady Voltage Stage shown in FIG. 13 in accordance with an embodiment of the present invention, in which period iarm1<0. From t1 to t2, since iarm1<0 and the main switch S of the second bridge arm 20 is off, its parasitic capacitor charges quickly, while the parasitic capacitor of the main switch in the first bridge arm 10 discharges, the circuit modal diagram of the first bridge arm 10 during which period is the same as that in FIG. 14(b). When t1<t<t2, the auxiliary switch Sa in the submodule SM1j in the first bridge arm 10 turns on, so the clamping capacitor C in the submodule SM1j is coupled in parallel with the parasitic capacitor of the main switch S, which are discharged at the same time. When the auxiliary switch Sa in the submodule SM1j turns off, there is $$v_{c11}+v_{c12}+v_{c13}+v_{c14}<V_i.$$

Then, when the main switch S in the second bridge arm 20 turns on, the clamping capacitor C of the submodule SM11~SM1N in the first bridge arm 10 is coupled in parallel with the parasitic capacitor of the corresponding main switch S, which are charged at the same time by dc voltage source, till $$v_{c11}+v_{c12}+v_{c13}+v_{14}=V_i.$$

The circuit modal diagram of the first bridge arm 10 in this period is the same as that in FIG. 14(a). The above process continues in each switching cycle. Therefore, in the Steady Voltage Stage, the clamping capacitor voltage in the first bridge arm 10 is dynamically balanced at Vi/4.

Figure 16:
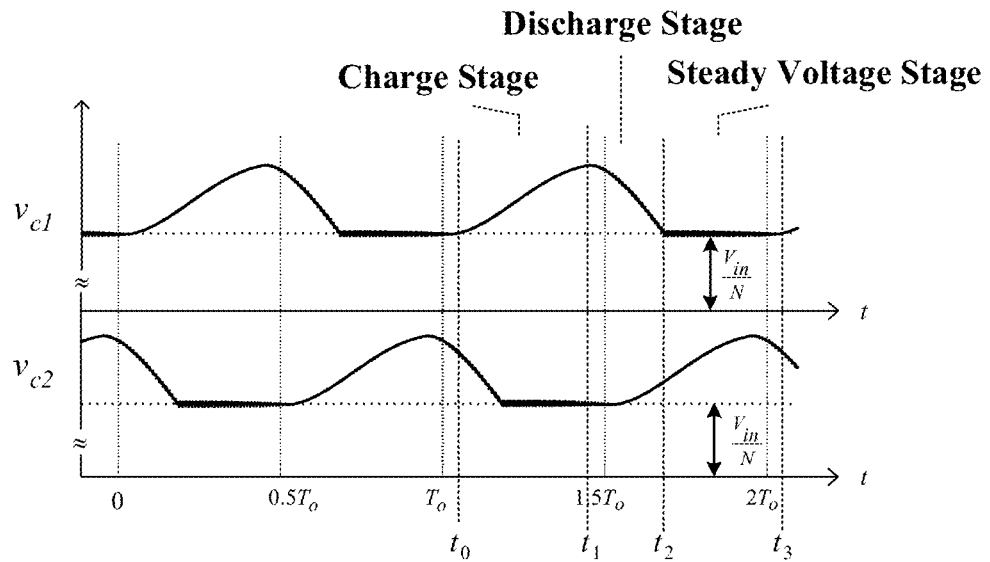
FIG. 16 illustrates working waveforms of the clamping capacitors voltage of the first bridge arm 10 and the second bridge arm 20 when the inverter circuit is in steady state (taking 4 series-connected switches as an example) in accordance with an embodiment of the present invention.

FIG. 16 illustrates working waveforms of the clamping capacitors voltage of the first bridge arm 10 and the second bridge arm 20 when the inverter circuit is in steady state (taking 4 series-connected switches as an example) in accordance with an embodiment of the present invention.

In the steady state waveforms shown in FIG. 16, from t0 to t1, the first bridge arm 10 is in Charge stage (iL>0, iarm1>0, iarm2<0). In the dead time after the main switch in the first bridge arm 10 turns off, the clamping capacitor of the submodules SM11~SM1N is charged by the freewheeling current of the parasitic inductor Larm1 of the first bridge arm 10. After several switching cycles, the clamping capacitor voltage of the first bridge arm 10 reaches peak value at the end of the Charge Stage. The second bridge arm 20 is in the Discharge Stage. The auxiliary switch Sa in the auxiliary modules SM21~SM2N of the second bridge arm 20 turns on for a predetermined time to alternatively. Since iarm2<0, the corresponding clamping capacitors C discharge in turn. After several switching cycles, when the clamping capacitor voltages satisfy $v_{c21}+v_{c22}+v_{c23}+v_{c24}-V_i$, the second bridge arm 20 enters the Steady Voltage Stage. From t1 to t2, the first bridge arm 10 is in the Discharge stage (iL<0, iarm1<0, iarm2>0). The auxiliary switch Sa in the auxiliary modules SM11~SM1N of the first bridge arm 10 turns on for a predetermined time ta alternatively. Since iarm2<0, the corresponding clamping capacitors C discharge in turn. The second bridge arm 20 is in the Charge Stage. The duration of the Discharge Stage is affected by the number of submodules inserted into the dead time in each bridge arm and the predetermined time ta of the auxiliary switch Sa. If ta is set properly, after several switching cycles, at the end of the Discharge Stage, there will be $v_{c11}+v_{c12}+v_{c13}+v_{c14}<V_i$. Then, the first bridge arm 10 enters the Steady Voltage Stage naturally, and the clamping capacitor voltages vc11~vc1N of the first bridge arm 10 are dynamically balanced at Vi/4. In general, in an output ac cycle To, the first bridge arm 10 goes through the Steady Voltage Stage, the Charge Stage, and the Discharge Stage, and then returns back to the Steady Voltage Stage, realizing the voltage balance of the clamping capacitors C in the first bridge arm 10. Using this voltage balance control method, a similar process also exists in the second bridge arm 20, finally achieving the clamping capacitor voltages in each bridge arm periodically balanced.

Figure 17:
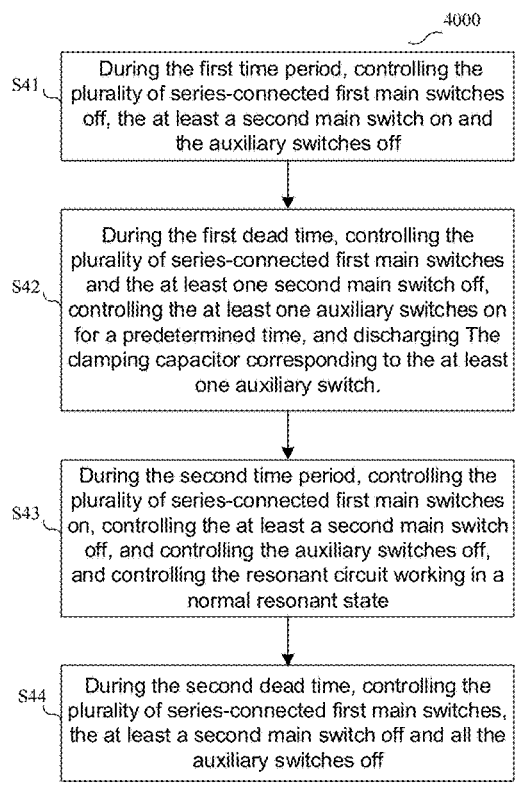
FIG. 17 is a flow chart of a control method of the LLC resonant circuit with series-connected switches in accordance with an embodiment of the present invention.

FIG. 17 is a flow chart 4000 of a control method of a bridge circuit with series-connected switches coupled in a resonant circuit in accordance with an embodiment of the present invention. The resonant circuit has a bridge circuit with series-connected switches, a resonant network, a transformer and a rectifier circuit, wherein the bridge circuit comprises a first bridge arm and a second bridge arm coupled to a common node, the first bridge arm comprising a plurality of series-connected first main switches, wherein each of the plurality of series-connected first main switch is coupled in parallel with an auxiliary module, each auxiliary module comprises a clamping capacitor and an auxiliary switch, the second bridge arm comprising at least a second main switch, the first bridge arm configured to receive a first main switch signal to control the plurality of series-connected first main switches, the second bridge arm configured to receive a second main switch signal to control the at least a second main switch, a switching cycle of the resonant circuit comprises a first time period, the first dead time, a second time period and a second dead time, and the control method comprises steps S41~S44:

At step S41, during the first time period, controlling the plurality of series-connected first main switches off, the at least a second main switch on and the auxiliary switches off.

At step S42, during the first dead time, controlling the plurality of series-connected first main switches and the at least a second main switch off, controlling the at least one auxiliary switch on for the predetermined time, and discharging the clamping capacitor corresponding to the at least one auxiliary switch.

At step S43, during the second time period, controlling the plurality of series-connected first main switches on, controlling the at least a second main switch off, controlling the auxiliary switches off, and controlling the resonant circuit working in a normal resonant state.

At step S44, during the second dead time, controlling the plurality of series-connected first main switches, the at least a second main switch and the auxiliary switches off.

For the control method of the LLC resonant circuit shown in FIG. 17, the control method further comprises:

A control circuit is used to sort the voltages of all the clamping capacitors, and control the auxiliary switch corresponding to the one or more clamping capacitors with the highest voltage on for a predetermined time.

In one embodiment of the present invention, the first time period is the time during which the first main switch signal maintains a low level and the second main switch signal maintains a high level, corresponding to t4~t5 in the working waveforms of the LLC resonant circuit shown in FIG. 8. The first dead time is the period when the first main switch signal maintains a low level and after the second main switch signal steps from a high level to a low level, corresponding to t5~t7 in the working waveforms of the LLC resonant circuit shown in FIG. 8. The second time period is the time when the second main switch signal maintains a low level and after the first main switch signal steps from a low level to a high level, corresponding to t1~t2 in the working waveforms of the LLC resonant circuit shown in FIG. 8. The second dead time is the period when the first main switch signal maintains a low level and after the second main switch signal steps from a high level to a low level, corresponding to t2~t4 in the working waveforms of the LLC resonant circuit shown in FIG. 8.

In other embodiments of the present invention, the second bridge arm may comprise a plurality of series-connected second main switches, wherein each of the plurality of series-connected second main switch is coupled in parallel with an auxiliary module, and each auxiliary module comprises a clamping capacitor and an auxiliary switch. In this case, the plurality of first main switches and the plurality of second main switches are controlled to turn off during the second dead time, while at least one auxiliary switch of the auxiliary module in the second bridge arm is controlled to keep on for a predetermined time and at least one clamping capacitor in the auxiliary module in the second bridge arm is discharged by the freewheeling current, wherein the predetermined time is less than or equal to the second dead time.

In one embodiment of the present invention, the method further comprises controlling the plurality of first main switches and the at least a second main switch off during the first dead time of a working cycle of the bridge circuit.

Figure 18:
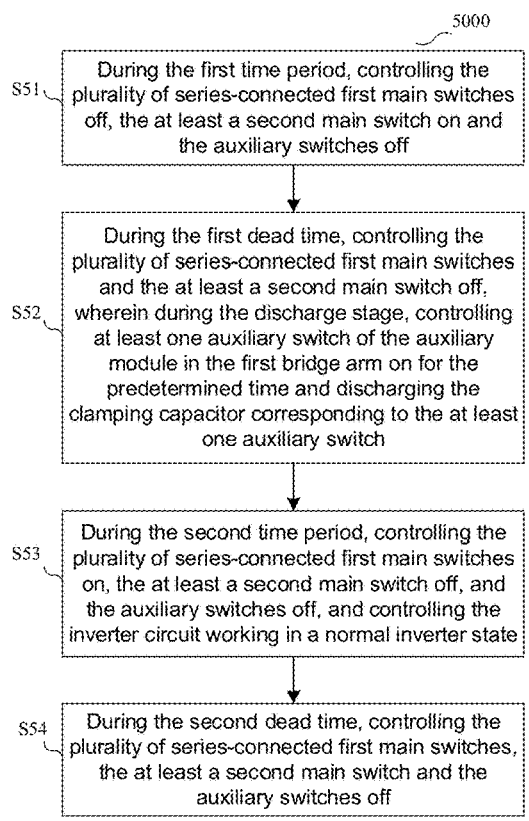
FIG. 18 is a flow chart of a control method of the inverter circuit with series-connected switches in accordance with an embodiment of the present invention.

FIG. 18 is a flow chart 5000 of a control method of a bridge circuit with series-connected switches coupled in an inverter circuit in accordance with an embodiment of the present invention. The inverter circuit has a bridge circuit with series-connected switches and a filter, the bridge circuit comprising a first bridge arm and a second bridge arm coupled to a common node, the first bridge arm comprising a plurality of series-connected first main switches, wherein each of the plurality of series-connected first main switch is coupled in parallel with an auxiliary module, each auxiliary module comprises a clamping capacitor and an auxiliary switch, the second bridge arm comprising at least a second main switch, the first bridge arm configured to receive a first main switch signal to control the plurality of series-connected first main switches, the second bridge arm configured to receive a second main switch signal to control the at least a second main switch. An output ac cycle of the inverter circuit comprises a charge stage and a discharge stage, wherein the output ac cycle comprises several switching cycles, and the switching cycle comprises a first time period, the first dead time, a second time period and a second dead time. The control method comprises steps S51~S54:

At step S51, during the first time period, controlling the plurality of series-connected first main switches off, the at least a second main switch on and the auxiliary switches off.

At step S52, during the first dead time, controlling the plurality of series-connected first main switches and the at least a second main switch off, wherein during the discharge stage, controlling at least one auxiliary switch of the auxiliary module in the first bridge arm on for the predetermined time and discharging the clamping capacitor corresponding to the at least one auxiliary switch.

At step S53, during the second time period, controlling the plurality of series-connected first main switches on, the at least a second main switch off, and the auxiliary switches off, and controlling the inverter circuit working in a normal inverter state.

At step S54, during the second dead time, controlling the plurality of series-connected first main switches, the at least a second main switch and the auxiliary switches off.

For the control method of the inverter circuit, the control method further comprises:

During the second dead time, controlling the plurality of series-connected first main switches and the at least a second main switch off, wherein during the discharge stage, controlling at least one auxiliary switch of the auxiliary module in the first bridge arm on for the predetermined time and discharging the clamping capacitor corresponding to the at least one auxiliary switch.

For the control method of the inverter circuit shown in FIG. 18, the control method further comprises:

A control circuit is used to sort the voltages of all the clamping capacitors, and control the auxiliary switch corresponding to the one or more clamping capacitors with the highest voltage on for a predetermined time.

In one embodiment of the present invention, the definitions of the first time period, the second time period, the first dead time and the second dead time in the one switching cycle are consistent with the LLC resonant circuit. The Charge Stage of one output cycle is the period when iarm1 is always positive, corresponding to t0~t1 in the waveforms of the inverter circuit shown in FIG. 13. The Discharge Stage starts from the moment when iarm1 is negative and ends when the clamping capacitor voltage in the first bridge arm discharges to around Vi/4 (taking 4 submodules as an example), corresponding to t1~t2 in the waveforms of the inverter circuit shown in FIG. 13. The Steady Voltage Stage starts from the end of the Discharge Stage till iarm1 is always positive, that is, the Charge Stage of the next output ac cycle, corresponding to t2~t3 in the waveforms of the inverter circuit shown in FIG. 13. Note that the duration of the Discharge Stage is affected by the number of submodules inserted into the dead time in each bridge arm and the predetermined time ta of the auxiliary switch Sa. When the predetermined time ta is short and the number of the inserted submodules is small, the discharge speed of the clamp capacitor is slow and the duration of the Discharge Stage is long. In the critical state, the end of the Discharge Stage is just the beginning of Charge Stage in the next switching cycle and hence there is no Steady Voltage Stage but only Charge and Discharge Stage, while in general cases, there are Charge, Discharge, and Steady Voltage Stage.

In other embodiments of the present invention, the second bridge arm may comprise a plurality of series-connected second main switches, wherein each of the plurality of series-connected second main switch is coupled in parallel with an auxiliary module, and each auxiliary module comprises a clamping capacitor and an auxiliary switch. In this case, the plurality of first main switches and the plurality of second main switches are controlled to turn off during the second dead time, while at least one auxiliary switch of the auxiliary module in the second bridge arm is controlled to keep on for a predetermined time and at least one clamping capacitor in the auxiliary module in the second bridge arm is discharged by the freewheeling current, wherein the predetermined time is less than or equal to the second dead time.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A bridge circuit with series-connected switches, comprising:
   a first bridge arm, comprising a first terminal, a second terminal and a control terminal, wherein a plurality of series-connected first main switches are coupled between the first terminal and the second terminal, each of the plurality of series-connected first main switches is coupled in parallel with a first auxiliary module, each first auxiliary module comprises a first clamping capacitor and a first auxiliary switch, and the control terminal is configured to receive a first main switch signal to control the plurality of series-connected first main switches;
   a second bridge arm, comprising a first terminal, a second terminal, a control terminal and at least a second main switch, wherein the first terminal of the second bridge arm is coupled with the second terminal of the first bridge arm at a common node, and the control terminal of the second bridge arm is configured to receive a second main switch signal to control the at least a second main switch;
   a voltage sensing circuit, configured to sample voltages of the first clamping capacitors in the first bridge arm, and configured to correspondingly generate first voltage sensing signals according to the voltages of the first clamping capacitors; and
   a control circuit, configured to receive the first voltage sensing signals and correspondingly generate first auxiliary switch signals according to the first voltage sensing signals and a first dead time to respectively control the first auxiliary switches,
wherein when a certain first voltage sensing signal ranks at top M among the first voltage sensing signals, the control circuit is configured to control the first auxiliary switch corresponding to the certain first voltage sensing signal keeping on for a first predetermined time during the first dead time, wherein the first predetermined time is less than or equal to the first dead time, and M is a natural number greater than or equal to one, and
wherein the common node is configured to output an output current and an output voltage, a working cycle comprises the first dead time and a second dead time, during the working cycle, when the output current is configured to lag behind the output voltage, the first dead time is before a rising edge of the first main switch signal, the second dead time is before a rising edge of the second main switch signal, when the output current is configured to lead the output voltage, the first dead time is before a rising edge of the second main switch signal, the second dead time is before a rising edge of the first main switch signal.

2. The bridge circuit of claim 1, wherein the control circuit is configured to turn on the first auxiliary switch corresponding to the certain first voltage sensing signal before a falling edge of the first main switch signal if the first dead time is after the falling edge of the first main switch signal or before a falling edge of the second main switch signal if the first dead time is after the falling edge of the second main switch signal.

3. The bridge circuit of claim 1, wherein the control circuit is configured to discharge the first clamping capacitor corresponding to the certain first auxiliary switch through a freewheeling current during the first dead time.

4. The bridge circuit of claim 1, wherein the control circuit comprises:
a plurality of sub-controllers, configured to correspondingly receive the first voltage sensing signals; and
a main controller, configured to correspondingly receive the first voltage sensing signals from the plurality of sub-controllers, configured to sort the first voltage sensing signals according to their values, and configured to send turn-on instruction signals to ones of the plurality of sub-controllers corresponding to the first voltage sensing signals ranking the top M among the first voltage sensing signals and send turn-off instruction signals to rest of the plurality of sub-controllers,
wherein when the ones of the plurality of sub-controllers receive the turn-on instruction signals, they are configured to correspondingly generate turn-on signals to respectively turn on the first auxiliary switches corresponding to the ones of the plurality of sub-controllers, and
wherein when the rest of the plurality of sub-controllers receive the turn-off instruction signals, they are configured to generate turn-off signals to respectively turn off the first auxiliary switches corresponding to the rest of the plurality of sub-controllers.

5. The bridge circuit of claim 1, wherein the common node is configured to output an output current and an output voltage, during a working cycle of the bridge circuit, when the output current is configured to lag behind the output voltage, the first dead time is before rising edge of the first main switch signal, when the output current is configured to lead the output voltage, the first dead time is before a rising edge of the second main switch signal.

6. The bridge circuit of claim 1, wherein the common node is configured to output an output current and an output voltage, a working cycle comprises the first dead time and a second dead time, during the working cycle, when the output current is configured to lag behind the output voltage, the second dead time is before a rising edge of the second main switch signal, when the output current is configured to lead the output voltage, the second dead time is before a rising edge of the first main switch signal.

7. The bridge circuit of claim 6, wherein the second bridge arm comprises a plurality of series-connected second main switches,
wherein each of the plurality of series-connected second main switch is coupled in parallel with a second auxiliary module, each second auxiliary module comprises a second clamping capacitor and a second auxiliary switch,
wherein the voltage sensing circuit is configured to sample voltages of the second clamping capacitors in the second bridge arm and is configured to correspondingly generate second voltage sensing signals,
wherein the control circuit is configured to receive the second voltage sensing signals and correspondingly generate second auxiliary switch signals to control the second auxiliary switches respectively, and
wherein when a certain second voltage sensing signal ranks at top K among the second voltage sensing signals, the control circuit is configured to control the second auxiliary switch corresponding to the certain second voltage sensing signal keeping on for a second predetermined time during the second dead time, wherein the second predetermined time is less than or equal to the second dead time, K is a natural number greater than or equal to one.

8. The bridge circuit of claim 6, further comprising:
a third bridge arm, having a first terminal, a second terminal and a control terminal, wherein the first terminal of the third bridge arm is coupled with the first terminal of the first bridge arm, a plurality of series-connected third main switches are coupled between the first terminal and the second terminal of the third bridge arm, and the control terminal of the third bridge arm is configured to receive the second main switch signal to control the plurality of series-connected third main switches; and
a fourth bridge arm coupled with the third bridge arm,
wherein each of the plurality of series-connected third main switches is coupled parallel with a third auxiliary module, and each third auxiliary module comprises a third clamping capacitor and a third auxiliary switch, the voltage sensing circuit is configured to sample voltages of the third clamping capacitors in the third bridge arm and is configured to correspondingly generate third voltage sensing signals, the control circuit is configured to receive the third voltage sensing signals and correspondingly generate third auxiliary switch signals to respectively control the third auxiliary switches, wherein when a certain third voltage sensing signal ranks at top P among the third voltage sensing signals, the control circuit is configured to control the third auxiliary switch corresponding to the certain third voltage sensing signal keeping on for a third predetermined time during the second dead time, the third predetermined time is less than or equal to the second dead time, P is a natural number greater than or equal to one.

9. The bridge circuit of claim 6, further comprising:
a third bridge arm; and
a fourth bridge arm, coupled with the third bridge arm, the fourth bridge arm has a first terminal, a second terminal and a control terminal, wherein the second terminal of the fourth bridge arm is coupled with the second terminal of the second bridge arm, a plurality of series-connected fourth main switches are coupled between the first terminal and the second terminal of the fourth bridge arm, and the control terminal of the fourth bridge arm is configured to receive the first main switch signal to control the plurality of series-connected fourth main switches,
wherein each of the plurality of series-connected fourth main switches is coupled parallel with a fourth auxiliary module, and each fourth auxiliary module comprises a fourth clamping capacitor and a fourth auxiliary switch, the voltage sensing circuit is configured to sample voltages of the fourth clamping capacitors in the fourth bridge arm and correspondingly generate fourth voltage sensing signals, the control circuit is configured to receive the fourth voltage sensing signals and correspondingly generate fourth auxiliary switch signals to respectively control the fourth auxiliary modules, wherein when a certain fourth voltage sensing signal ranks at top Q among the fourth voltage sensing signals, the control circuit is configured to control the fourth auxiliary switch corresponding to the certain fourth voltage sensing signal keeping on for a fourth predetermined time during the first dead time, the fourth predetermined time is less than or equal to the first dead time, Q is a natural number greater than or equal to one.

10. A control method for a bridge circuit with series-connected switches, wherein the bridge circuit comprises a first bridge arm and a second bridge arm, the first bridge arm comprises a plurality of series-connected first main switches, each of the plurality of series-connected first main switch is coupled in parallel with a first auxiliary module, each first auxiliary module comprises a first clamping capacitor and a first auxiliary switch, the second bridge arm comprises at least a second main switch, the first bridge arm is configured to receive a first main switch signal to control the plurality of series-connected first main switches, the second bridge arm is configured to receive a second main switch signal to control the at least a second main switch, the control method comprising:
sensing voltages of the first clamping capacitors in the first bridge arm and correspondingly generating first voltage sensing signals;
sorting the voltage sensing signals according to the sensing voltage value and getting a sorting result; and
turning on at least one first auxiliary switch for a predetermined time during a first dead time according to the sorting result of the first voltage sensing signals, wherein the predetermined time is equal to or less than the first dead time,
wherein when a certain first voltage sensing signal ranks at top M among the first voltage sensing signals, the control circuit is configured to control the first auxiliary switch corresponding to the certain first voltage sensing signal keeping on for a first predetermined time during the first dead time, wherein the first predetermined time is less than or equal to the first dead time, and M is a natural number greater than or equal to one, and
wherein the common node is configured to output an output current and an output voltage, a working cycle comprises the first dead time and a second dead time, during the working cycle, when the output current is configured to lag behind the output voltage, the first dead time is before a rising edge of the first main switch signal, the second dead time is before a rising edge of the second main switch signal, when the output current is configured to lead the output voltage, the first dead time is before a rising edge of the second main switch signal, the second dead time is before a rising edge of the first main switch signal.

11. The control method of claim 10, wherein turning on at least one first auxiliary switch for the predetermined time during the first dead time according to the sorting result of the first voltage sensing signals comprises:
sorting the first voltage sensing signals, and turning on the first auxiliary switches corresponding to certain first voltage sensing signals ranking on top M among the first voltage sensing signals for the predetermined time, wherein M is a natural number greater than or equal to one.

12. The control method of claim 11, further comprising:
correspondingly receiving the first voltage sensing signals by a plurality of sub-controllers; and
correspondingly receiving the first voltage sensing signals output by the plurality of sub-controllers and sorting the first voltage sensing signals according to their value by a main controller, sending turn-on instruction signals to ones of the plurality of sub-controllers corresponding to the certain first voltage sensing signals ranking the top M among the first voltage sensing signals and sending turn-off instruction signals to rest of the plurality of sub-controllers,
wherein when the ones of the plurality of sub-controller receiving the turn-on instruction signals are configured to correspondingly generate turn-on signals to respectively turn on the first auxiliary switches correspondingly, and
wherein when the rest of the plurality of sub-controllers receiving the turn-off instruction signals are configured to generate turn-off signals to respectively turn off the first auxiliary switches correspondingly.

13. The control method of claim 10, wherein the second bridge arm comprises a plurality of series-connected second main switch, each of the plurality of series-connected second main switch is coupled in parallel with a second auxiliary module, each second auxiliary module comprises a second clamping capacitor and a second auxiliary switch, the control method further comprising:
sampling voltages of the second clamping capacitors in the second bridge arm and correspondingly generating second voltage sensing signals,
wherein the control circuit is configured to receive the second voltage sensing signals and correspondingly generate second auxiliary switch signals to control the second auxiliary switches respectively according to the second voltage sensing signals, and
wherein when a certain second voltage sensing signal ranks at top K among the second voltage sensing signals, the control circuit is configured to control the second auxiliary switch corresponding to the certain second voltage sensing signal keeping on for a second predetermined time during the second dead time, wherein the second predetermined time is less than or equal to the second dead time, K is a natural number greater than or equal to one.

14. A control method for a bridge circuit with series-connected switches, wherein the bridge circuit comprises a first bridge arm and a second bridge arm coupled at a common node, the first bridge arm comprises a plurality of series-connected first main switches, each of the plurality of series-connected first main switch is coupled in parallel with an auxiliary module, each auxiliary module comprises a clamping capacitor and an auxiliary switch, the second bridge arm comprises at least a second main switch, the first bridge arm is configured to receive a first main switch signal to control the plurality of series-connected first main switches, the second bridge arm is configured to receive a second main switch signal to control the at least a second main switch, the control method comprising:
- sensing voltages of the clamping capacitors in the first bridge arm and correspondingly generating voltage sensing signals; and
- turning on at least one auxiliary switch for a predetermined time during a first dead time according to a sorting result of the voltage sensing signals, wherein the predetermined time is equal to or less than the first dead time,
- wherein the first dead time is configured to be a time from a falling edge of the second main switch signal to a rising edge of the first main switch signal,
- wherein when a certain first voltage sensing signal ranks at top M among the first voltage sensing signals, the control circuit is configured to control the first auxiliary switch corresponding to the certain first voltage sensing signal keeping on for a first predetermined time during the first dead time, wherein the first predetermined time is less than or equal to the first dead time, and M is a natural number greater than or equal to one, and
- wherein the common node is configured to output an output current and an output voltage, a working cycle comprises the first dead time and a second dead time, during the working cycle, when the output current is configured to lag behind the output voltage, the first dead time is before a rising edge of the first main switch signal, the second dead time is before a rising edge of the second main switch signal, when the output current is configured to lead the output voltage, the first dead time is before a rising edge of the second main switch signal, the second dead time is before a rising edge of the first main switch signal.

15. The control method of claim 14, wherein the bridge circuit is coupled in a resonant circuit, the resonant circuit comprises a resonant network, a transformer and a rectifier circuit, a switching cycle of the resonant circuit comprises a first time period, the first dead time, a second time period and a second dead time, the control method further comprising:
- during the first time period, controlling the plurality of series-connected first main switches off, the at least a second main switch on and the auxiliary switches off;
- during the first dead time, controlling the plurality of series-connected first main switches and the at least a second main switch off, controlling the at least one auxiliary switch on for the predetermined time, and discharging the clamping capacitor corresponding to the at least one auxiliary switch;
- during the second time period, controlling the plurality of series-connected first main switches on, controlling the at least a second main switch off, controlling the auxiliary switches off, and controlling the resonant circuit working in a normal resonant state; and
- during the second dead time, controlling the plurality of series-connected first main switches, the at least a second main switch and the auxiliary switches off,
- wherein the second dead time is configured to be a time from a falling edge of the first main switch signal to a rising edge of the second main switch signal.

16. The control method of claim 15, further comprising:
- during the first time period, controlling the plurality of series-connected first main switches off, the at least a second main switch on and the auxiliary switches off;
- during the first dead time, controlling the plurality of series-connected first main switches, the at least a second main switch and the auxiliary switches off;
- during the second time period, controlling the plurality of series-connected first main switches on, the at least a second main switch off, and the auxiliary switches off, and controlling the inverter circuit working in a normal inverter state; and
- during the second dead time, controlling the plurality of series-connected first main switches and the at least a second main switch off, wherein during the discharge stage, controlling at least one auxiliary switch of the auxiliary module in the first bridge arm on for the predetermined time and discharging the clamping capacitor corresponding to the at least one auxiliary switch.

17. The control method of claim 14, wherein the bridge circuit is coupled in an inverter circuit, an output ac cycle of the inverter circuit comprises a charge stage and a discharge stage, wherein the output ac cycle comprises several switching cycles, and the switching cycle comprises a first time period, the first dead time, a second time period and a second dead time, the control method further comprising:
- during the first time period, controlling the plurality of series-connected first main switches off, the at least a second main switch on and the auxiliary switches off;
- during the first dead time, controlling the plurality of series-connected first main switches and the at least a second main switch off, wherein during the discharge stage, controlling at least one auxiliary switch of the auxiliary module in the first bridge arm on for the predetermined time and discharging the clamping capacitor corresponding to the at least one auxiliary switch;
- during the second time period, controlling the plurality of series-connected first main switches on, the at least a second main switch off, and the auxiliary switches off, and controlling the inverter circuit working in a normal inverter state; and
- during the second dead time, controlling the plurality of series-connected first main switches, the at least a second main switch and the auxiliary switches off.

18. The control method of claim 17, wherein the output ac cycle of the inverter circuit further comprises a discharge stage, and during the discharge stage, controlling the at least one auxiliary switch on for the predetermined time.

* * * * *